(12) United States Patent
Matsuhisa

(10) Patent No.: US 7,578,186 B2
(45) Date of Patent: Aug. 25, 2009

(54) INERTIAL SENSOR AND FABRICATION METHOD OF INERTIAL SENSOR

(75) Inventor: Kazuhiro Matsuhisa, Tokyo (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 11/761,680

(22) Filed: Jun. 12, 2007

(65) Prior Publication Data

US 2008/0236279 A1 Oct. 2, 2008

(30) Foreign Application Priority Data

Jun. 16, 2006 (JP) .............................. 2006-167758

(51) Int. Cl.
*G01C 19/56* (2006.01)
*G01P 9/04* (2006.01)
*G01P 15/125* (2006.01)

(52) U.S. Cl. ............... 73/504.12; 73/504.15; 73/514.32

(58) Field of Classification Search .............. 73/514.32, 73/514.36, 514.38, 504.04, 504.12, 504.15, 73/504.16

See application file for complete search history.

(56) References Cited

U.S. PATENT DOCUMENTS

| | | | | |
|---|---|---|---|---|
| 5,228,341 A * | 7/1993 | Tsuchitani et al. | ....... | 73/514.36 |
| 5,350,189 A * | 9/1994 | Tsuchitani et al. | .......... | 280/735 |
| 6,105,427 A * | 8/2000 | Stewart et al. | ........... | 73/514.32 |
| 6,308,569 B1 * | 10/2001 | Stewart | .................... | 73/514.32 |
| 6,591,678 B2 * | 7/2003 | Sakai | ...................... | 73/514.36 |
| 6,672,161 B2 * | 1/2004 | Sakai et al. | .............. | 73/514.32 |
| 7,004,026 B2 * | 2/2006 | Kano et al. | .............. | 73/514.32 |

FOREIGN PATENT DOCUMENTS

| | | |
|---|---|---|
| JP | 2000-018951 | 1/2000 |
| JP | 2006-098168 | 4/2006 |

* cited by examiner

*Primary Examiner*—Helen C. Kwok
(74) *Attorney, Agent, or Firm*—Sonnenschein Nath & Rosenthal LLP

(57) ABSTRACT

An inertial sensor and a fabrication method of an inertial sensor are provided. An inertial sensor includes: an elastic support whose one end is supported by a support part disposed on a substrate; an oscillator which is supported by the other end of the elastic support as it is separated from the substrate; and a displacement detecting part which detects a displacement of the oscillator to output a signal, wherein the oscillator is formed with one or both of a groove and a through hole in a direction in parallel with a drive direction of the oscillator.

4 Claims, 22 Drawing Sheets

FIG. 5

$x = A_x \sin(\omega_x t - \phi)$ $F_c(t) = 2mx(t)\Omega$ $m\ddot{z}(t) + \mu_z \dot{z}(t) + k_z z(t) = F_c(t)$ $\omega_z = \sqrt{\dfrac{k_z}{m}}$ $Q_z = \dfrac{\sqrt{mk_z}}{\mu_z}$ $\ddot{z}(t) + \dfrac{\omega_z}{Q_z}\dot{z}(t) + \omega_z^2 z(t) = 2A_x \Omega \cos(\omega_x t - \phi)$ IF THE DETUNING DEGREE IS $\alpha = \dfrac{\omega_z}{\omega_x}$, WHERE THE BOUNDARY CONDITIONS ARE SET AS
THE INITIAL DISPLACEMENT AND THE VELOCITY ARE ZERO,
THE EXACT SOLUTION IS OBTAINED AS:

$z(t) = \dfrac{2A_x \Omega \alpha}{\sqrt{(1-\alpha^2)^2 + \left(\dfrac{\alpha}{Q_z}\right)^2}} \left\{ \dfrac{\exp\left(\dfrac{-\omega_z t}{2Q_z}\right) \cos\left(\sqrt{1 - \left(\dfrac{1}{2Q}\right)^2}\,\omega_z t - \psi\right)}{\omega_x} + \dfrac{\cos(\omega_x t - \phi - \psi')}{\omega_z} \right\}$ IF THE TRANSIENT TERM $\exp\left(\dfrac{-\omega_z t}{2Q_z}\right)$ IS IGNORED,

THE FOLLOWING EQUATION IS OBTAINED:

$z(t) = \dfrac{2A}{\omega_x} \cdot \dfrac{1}{\sqrt{(1-\alpha^2)^2 + \left(\dfrac{\alpha}{Q_z}\right)^2}} \, \Omega \ast \cos(\omega_x t - \phi - \psi')$

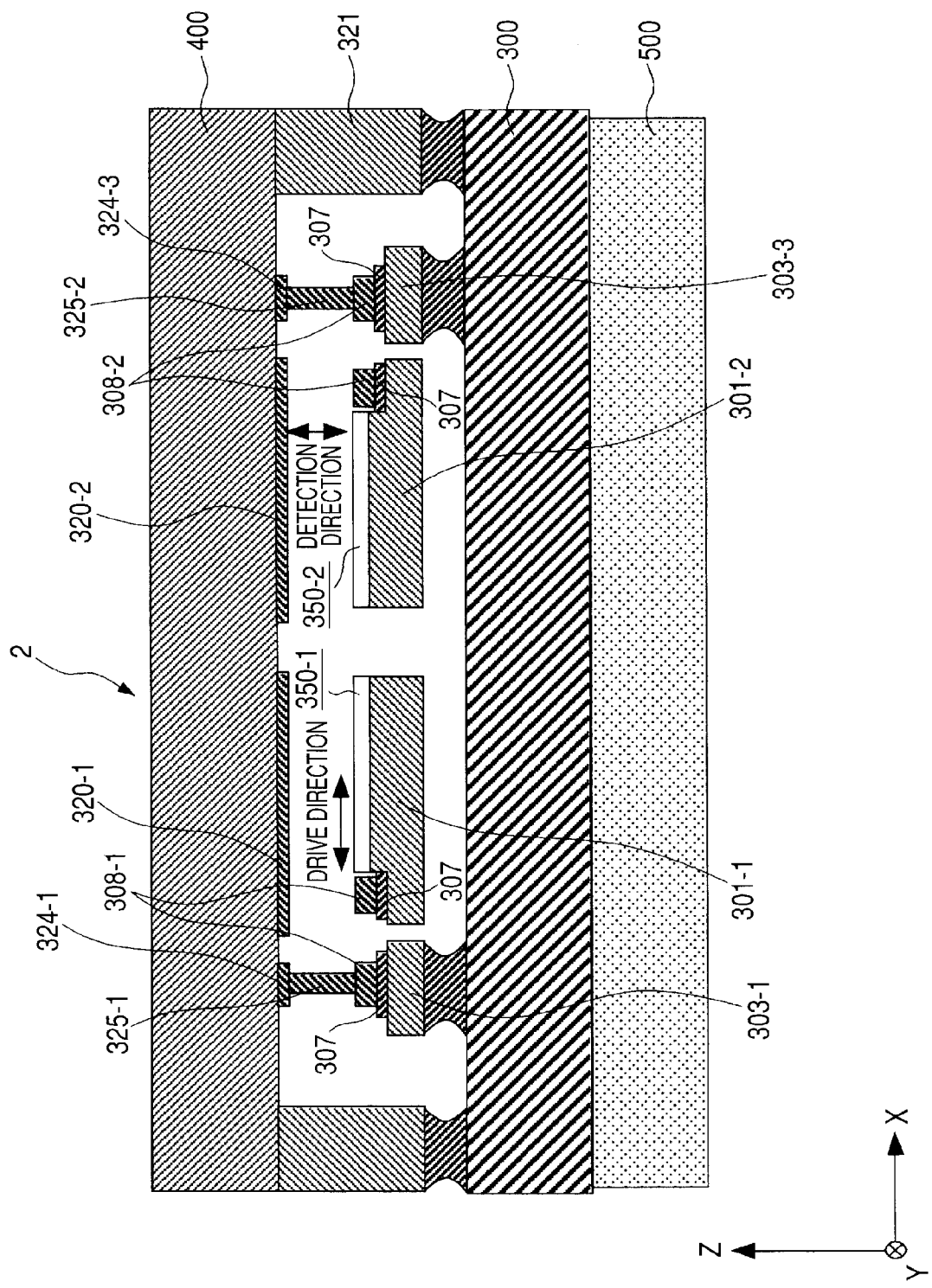

INERTIAL SENSOR AND FABRICATION METHOD OF INERTIAL SENSOR

CROSS REFERENCES TO RELATED APPLICATIONS

The present invention contains subject matter related to Japanese Patent Application JP 2006-167758 filed in the Japanese Patent Office on Jun. 16, 2006, the entire contents of which being incorporated herein by reference.

BACKGROUND OF THE INVENTION

1. Field of the Invention

The present invention relates to an inertial sensor and a fabrication method of an inertial sensor.

2. Description of the Related Art

In the related art, a vibrating gyroscope is known, which is processed using semiconductor process technique with materials such as silicon (Si). This type of gyroscope is one in which the inertial mass is vibrated in a predetermined direction to detect the magnitude of angular velocity by a displacement caused by the Coriolis force that occurs when the angular velocity enters. This angular velocity sensor can be applied to an input interface, and to the image stabilization of a video camera and a still camera, for example.

Generally, in such an angular velocity sensor, the vibration operation is hampered by the viscosity resistance of air surrounding the device, and the amplitude of the vibration becomes small, leading to a great decrease in the sensitivity of the sensor. It is necessary to increase drive voltage in order to obtain a desired amplitude of the vibration, causing problems of increased power consumption and an expensive voltage conversion circuit.

Because of these, a ceramic package, for example, is generally used to subject the sensor to vacuum encapsulation. However, in vacuum encapsulation with typical ceramic packages, when a degree of vacuum is increased too much, a serious problem interferes with the sensor characteristics due to influences such as a gas leakage into the package from outside, and gas produced inside the package. In addition, it is necessary to provide a robust airtight structure as the degree of vacuum is higher, which is a factor of a cost increase in the package.

For a technique which decreases the influence of the viscosity resistance with no pressure reduction (for example, see Patent Reference 1 (JP-A-2006-98168)), there is a technique which fills gas with an effective viscosity coefficient smaller than air. However, in the technique, only with regard to the atmospheric pressure, the Q value is about two times the air ratio at most, and generally, the effect is really small in the vibrating gyroscope which should have the Q value of a few hundreds to a few thousands.

In addition, the provision of vacuum encapsulation is performed to increase the Q value Qd on the drive side as well as to reduce drive voltage and power consumption correspondingly. However, taking it into account that the Q value Qs on the detection side is increased at the same time, an over shoot occurs in the transient response at the time when the angular velocity is applied, which prolongs a time period necessary to reach the stable state, causing a problem at the same time that the response and a signal-to-noise ratio are reduced.

In addition, it is proposed that a sensor with non-linear characteristics is used to increase the drive amplitude (for example, see Patent Reference 2 (JP-A-2000-18951)). With the use of this method, the voltage on the drive side is reduced, and at the same time, control is allowed with no influence on the response on the detection side. However, in the technique, because the non-linear vibration is used, the amplitude might be greatly reduced due to a jump phenomenon, for example, when mechanical and electrical impact is applied, lacking stability.

SUMMARY OF THE INVENTION

In vacuum encapsulation, it is necessary to improve the airtight properties, which demands a package in a secure airtight structure to increase costs of the package. Moreover, for a technique which reduces the influence of the viscosity resistance with no pressure reduction, which is the technique that fills gas with an effective viscosity coefficient smaller than air, it is difficult to obtain a sufficiently high Q value. Furthermore, when the degree of vacuum is raised to increase the drive Q value, a time period to reach the stable state is prolonged because of the occurrence of an overshoot in the transient response at the time when the angular velocity is applied, causing a problem of degraded response. Moreover, when a sensor with non-linear characteristics is used to increase the drive amplitude, the amplitude might be greatly reduced due to a jump phenomenon, for example, when mechanical and electrical impact is applied, lacking stability.

Thus, it is desirable to achieve the suppression of a detection Q value while a drive Q value is increased, as well as the prevention of an overshoot when the angular velocity is applied while drive voltage and power consumption are being suppressed.

An inertial sensor according to an embodiment of the invention is an inertial sensor including: an elastic support whose one end is supported by a support part disposed on a substrate; an oscillator which is supported by the other end of the elastic support as it is separated from the substrate; and a displacement detecting part which detects a displacement of the oscillator to output a signal, wherein the oscillator is formed with one or both of a groove and a through hole in a direction in parallel with a drive direction of the oscillator.

In the inertial sensor according to an embodiment of the invention, since one or both of the groove and the through hole is formed in the direction in parallel with the drive direction of the oscillator, the difference of the viscous damping coefficient can be provided in structure in the individual modes such as the drive mode and the detection mode. In other words, with respect to the oscillator to be the inertial mass, one or both of the groove and the through hole is formed in the direction in parallel with the drive mode, whereby the drive Q value can be increased. In addition, since the detection mode is in the rotating direction about the X-axis and the Y-axis in parallel with the surface of the substrate, it does not have the benefit of the Q value due to the formation of the groove and the through hole, rather the motion is hampered because of the existence of the groove and the through hole, and the detection Q value is decreased. Therefore, an overshoot can be prevented at the time when the angular velocity is applied, while drive voltage and power consumption are being suppressed. Accordingly, an increase in the detection Q value can be suppressed, while the drive Q value is being increased.

A fabrication method of an inertial sensor according to an embodiment of the invention is a fabrication method of an inertial sensor having an elastic support whose one end is supported by a support part disposed on a substrate; an oscillator which is supported by the other end of the elastic support as it is separated from the substrate; and a displacement detecting part which detects a displacement of the oscillator to output a signal, the method including the step of: forming one or both of a groove and a through hole in a direction in parallel with a drive direction of the oscillator in a step of forming the oscillator.

In the fabrication method of an inertial sensor according to an embodiment of the invention, one or both of the groove and the through hole is formed in the direction in parallel with the drive direction of the oscillator in the step of forming the oscillator. Thus, the difference of the viscous damping coefficient can be provided in structure in the individual modes such as the drive mode and the detection mode. In other words, with respect to the oscillator to be the inertial mass, one or both of the groove and the through hole is formed in the direction in parallel with the drive mode, whereby the drive Q value can be increased. In addition, since the detection mode is in the rotating direction about the X-axis, the Y-axis, it does not have the benefit of the Q value due to the formation of one or both of the groove and the through hole, rather the motion is hampered because of the existence of the groove and the through hole, and the detection Q value is decreased. Therefore, an overshoot can be prevented at the time when the angular velocity is applied, while drive voltage and power consumption are being suppressed. Accordingly, an increase in the detection Q value can be suppressed, while the drive Q value is being increased.

In accordance with the inertial sensor according to an embodiment of the invention, since the Q value can be increased even tough the degree of vacuum is close to the atmospheric pressure, the influence of a gas leakage into the package from outside or gas generated inside the package can be prevented. Therefore, such advantages can be obtained that the airtight structure of the package can be simplified, and that the cost of the package can be decreased. In addition, as compared with the configuration in which the degree of vacuum is raised to increase the Q value, an increase in the Q value on the detection side can be suppressed. Therefore, such advantages can be provided that the time period for stable state of the damping oscillation is shortened at the time when the angular velocity is applied, and that the signal-to-noise ratio and the response of the inertial sensor are improved.

In accordance with the fabrication method of an inertial sensor according to an embodiment of the invention, since the Q value can be increased even though the degree of vacuum is close to the atmospheric pressure, the influence of a gas leakage into the package from outside or gas generated inside the package can be prevented. Therefore, such advantages can be obtained that the airtight structure of the package can be simplified, and that the cost of the package can be decreased. In addition, as compared with the case in which the degree of vacuum is raised to increase the Q value, an increase in the Q value on the detection side can be suppressed. Therefore, such advantages can be provided that the time period for stable state of the damping oscillation is shortened at the time when the angular velocity is applied, and that the signal-to-noise ratio and the response of the inertial sensor are improved.

BRIEF DESCRIPTION OF THE DRAWINGS

FIG. 5 shows a diagram illustrative of a mathematical expression of an exact solution of the vibration according to the first embodiment;

FIG. 17 shows a cross section schematically depicting the configuration of an embodiment (the second embodiment) of the inertial sensor according to the invention;

DETAILED DESCRIPTION OF THE INVENTION

Figure 1A:
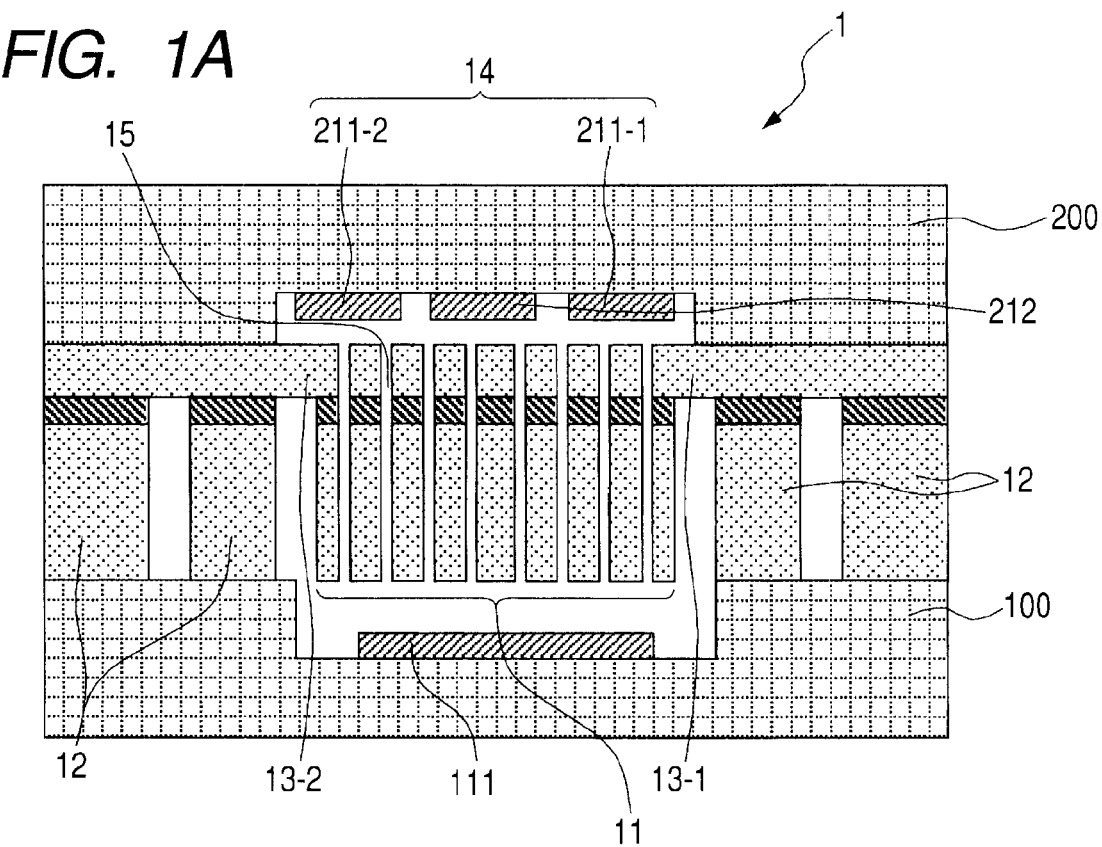
FIGS. 1A and 1B show diagrams depicting an embodiment (a first embodiment) of an inertial sensor according to the invention.
Figure 1B:
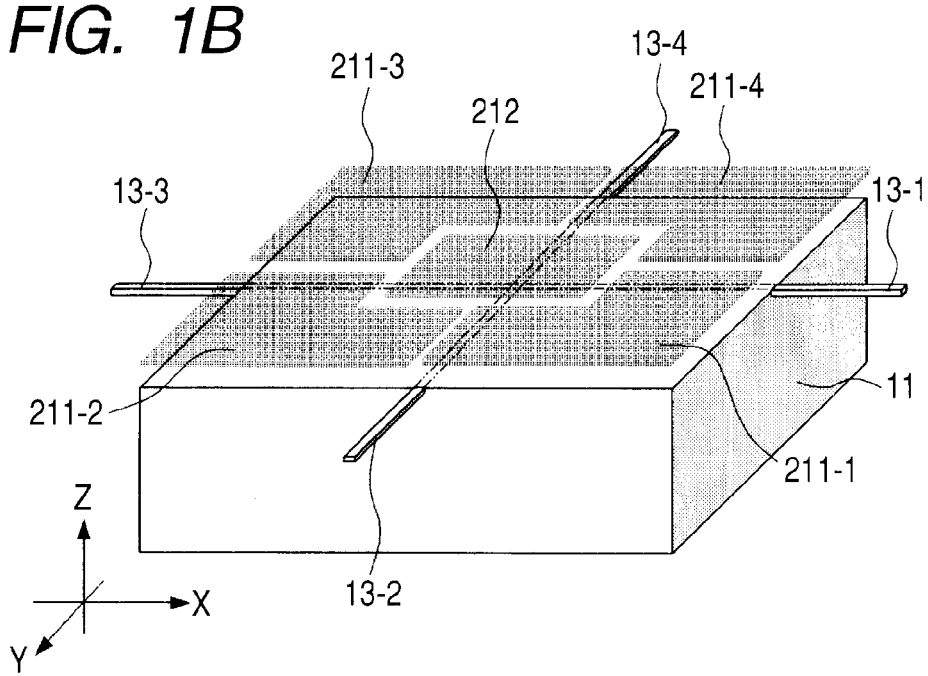
Figure 2A:
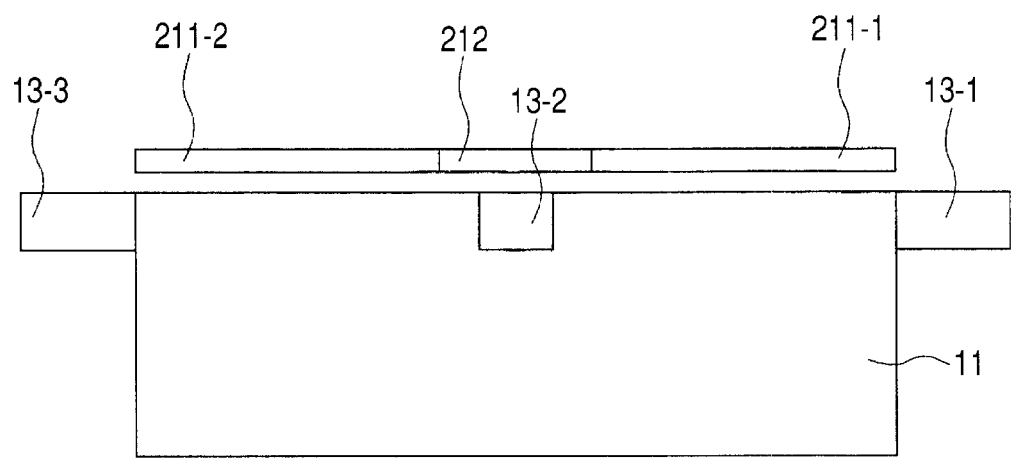
FIGS. 2A and 2B show diagrams depicting an embodiment (the first embodiment) of the inertial sensor according to the invention.
Figure 2B:
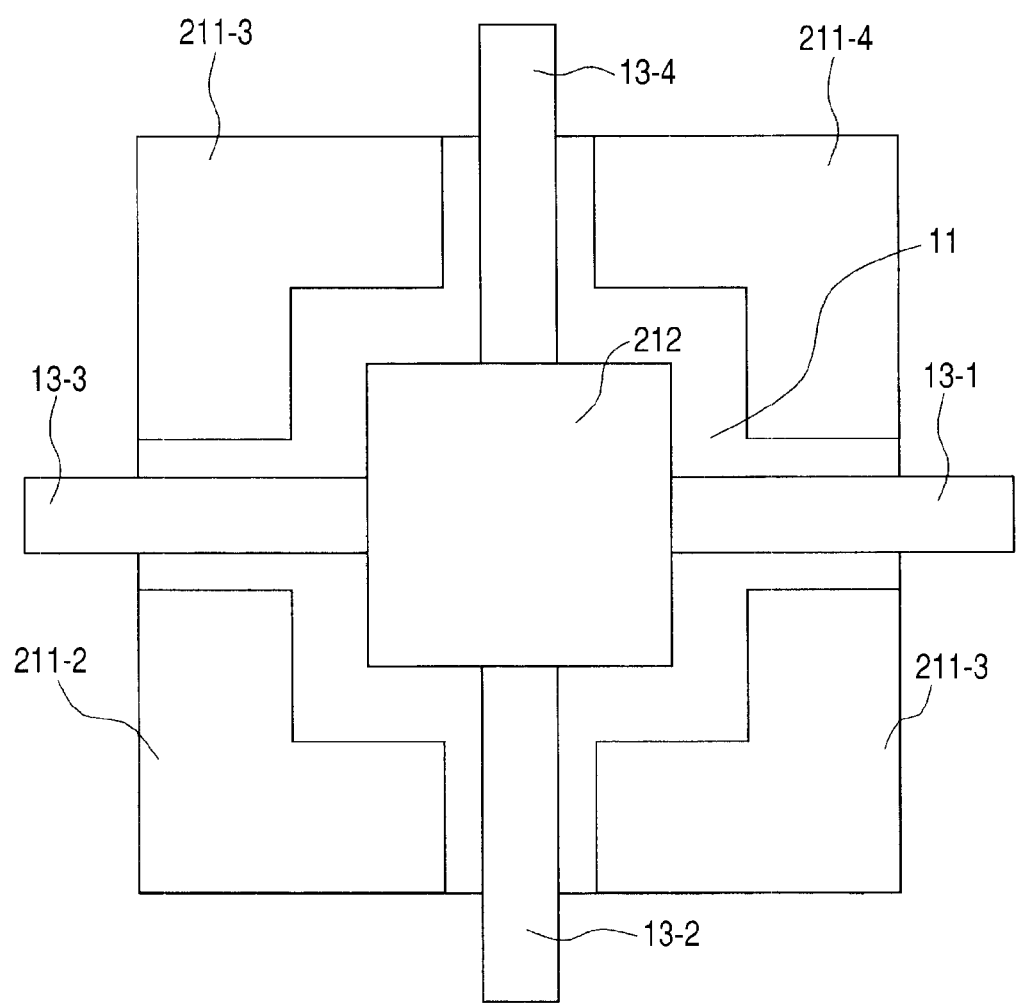

An embodiment (the first embodiment) of the inertial sensor according to the invention will be described with reference to FIGS. 1A to 2B. In FIGS. 1A to 2B, as an exemplary inertial sensor is shown which is formed of a multi-axis complex sensor including an angular velocity sensor. FIG. 1A shows a cross section schematically depicting the configuration of the inertial sensor, and FIG. 1B shows a perspective view depicting the outline of an exemplary configuration of an oscillator and an electrode disposed thereon. FIG. 2A shows a front view depicting the relation between the positions of the oscillator, elastic supports and the electrode, and FIG. 2B shows a plan view.

As shown in FIGS. 1A to 2B, a first substrate 100 is formed with support parts 12, and the support parts 12 support the one ends of elastic supports 13-1 to 13-4. At the other ends of the individual elastic supports 13-1 to 13-4, an oscillator 11 is supported by the first substrate 100 and a second substrate 200, described later, as the oscillator is separated from the substrates. In addition, a displacement detecting part 14 which detects the displacement of the oscillator 11 and outputs a signal is disposed on the side of the second substrate 200 facing to the oscillator 11, for example. Here, it is configured to detect the displacement of the oscillator 11 by a change in the capacitance between the oscillator 11 and electrodes 211-1 to 211-4 disposed above the oscillator 11. In addition, it is configured in which a drive electrode 212 disposed above the oscillator 11 drives the oscillator 11 in a third axis (for example, the z-axis) direction in a three-dimensional coordinate system, for example. In addition, on the first substrate 100 under the oscillator 11, an electrode 111 is formed which monitors the drive of the oscillator 11, for example. Moreover, the oscillator 11 has through holes 15 in the direction in parallel with the drive direction of the oscillator 11. Instead of forming the through holes 15, the grooves with depth in the drive direction may be formed, or both of the through holes and the grooved may be formed. In addition, the groove includes holes not penetrating through the oscillator. In addition, a groove (not shown) may be formed on the side surface of the oscillator 11 in the direction in parallel with the drive direction of the oscillator 11.

The inertial sensor 1 according to an embodiment of the invention has the oscillator 11, an exciting module (the drive electrode 212) which oscillates the oscillator 11 with a frequency high enough for the response necessary for the acceleration and the angular velocity in the third axis (for example, the Z-axis) direction in the three dimensional coordinate system, the displacement detecting part 14 (the electrodes 211-1 to 211-4 for detecting the acceleration and the angular velocity) which detects the displacement, a signal separating module (not shown) which separates low frequency components from components around the excitation frequency in the signal obtained in the displacement detecting part 14, a computing module (not shown) which determines the acceleration in the first axis (for example, the X-axis) direction in the low frequency component, and an angular velocity computing module (not shown) which determines the angular velocity about the second axis (for example, the Y-axis), whereby the inertial sensor can detect both of the angular velocity and the acceleration in detecting the acceleration in the first axis (for example, the X-axis) direction and the angular velocity about a second axis (for example, the Y-axis) in the three dimensional coordinate system. The inertial sensor 1 has the through holes 15 in the third axis direction of the oscillator, whereby the viscosity resistance in the drive direction is reduced, and the viscosity resistance in the detection direction is increased.

Hereinafter, the operational principles of the inertial sensor 1 will be described.

At first, a method of detecting the angular velocity will be described.

Between the oscillator 11 and the drive electrode 212, an ac voltage that drives the oscillator 11 at its resonance frequency is applied in the third axis (for example, the Z-axis in the three dimensional coordinate system) direction described above, the electrostatic force is generated between the oscillator 11 and the drive electrode 212, and the oscillator 11 is periodically driven.

Here, when the angular velocity is applied around the first axis (for example, the X-axis in the three dimensional coordinate system), a Coriolis force $F_{coriolis}$ occurs in the second axis (for example, the Y-axis in the three-dimensional coordinate system) direction. The Coriolis force $F_{coriolis}$ is expressed by the following equation.

$$F_{coriolis} = 2 \, mv\Omega$$

Where, m is the mass of the oscillator 11, v is the vibration velocity in the drive direction, and $\Omega$ is the angular velocity that is externally applied.

Figure 3:
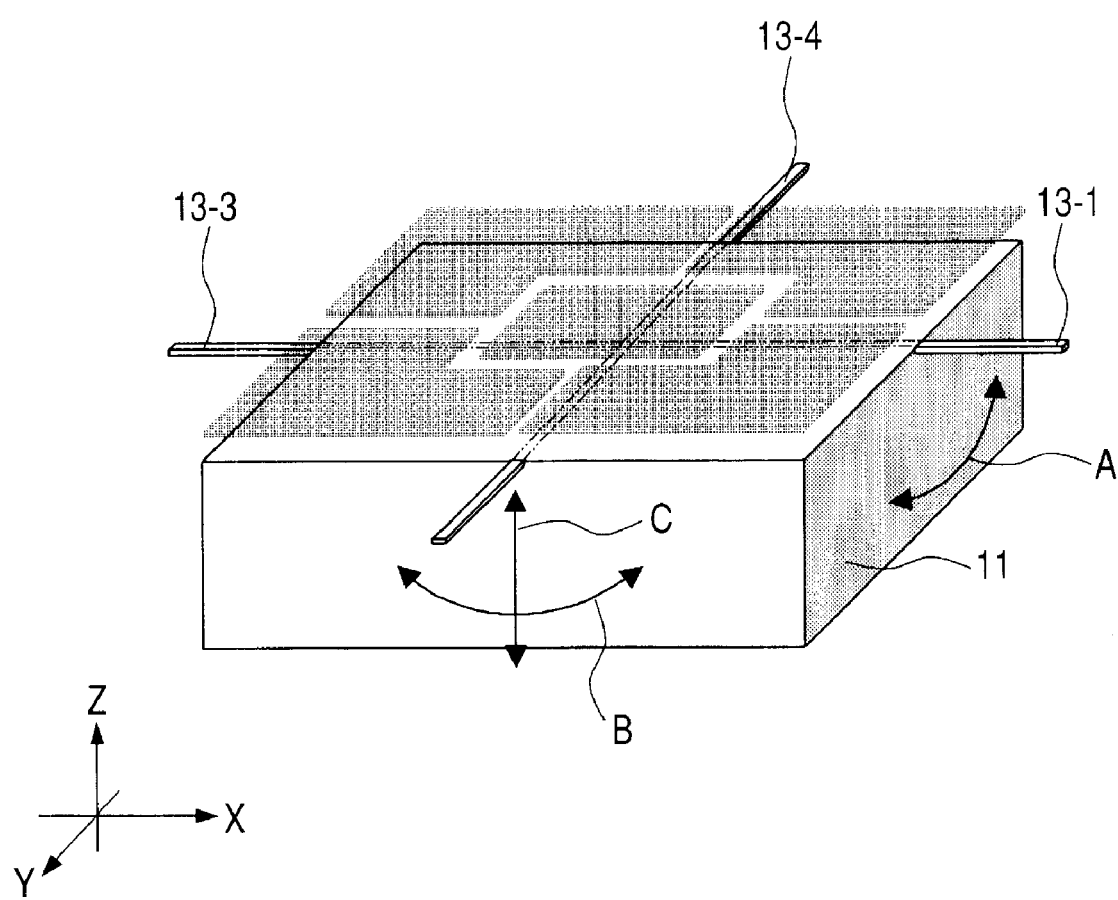
FIG. 3 shows a schematic perspective view illustrative of the vibration mode of the inertial sensor according to the first embodiment.
Figure 4A:
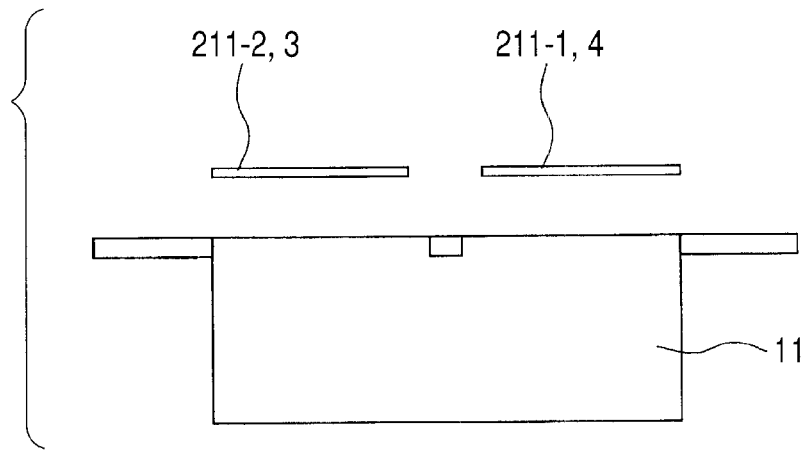
FIGS. 4A and 4B show schematic diagrams illustrative of the detection of changes in electrostatic capacitance of the inertial sensor according to the first embodiment.

When the Coriolis force occurs in the second axis (for example, the Y-axis in the three dimensional coordinate system) direction, a force is applied to the oscillator 11, and it is displaced in the second axis direction. As shown in FIG. 3, in the oscillator 11, since the position of the center of gravity and the position supported by the elastic supports 13-1 to 4 are varied in height, the Coriolis force generates a moment, and the oscillator oscillates in the torsion direction (the directions of arrows A and B). Furthermore, the drive direction of the drive electrode 212 is in the Z-direction (the direction of arrow C). As shown in FIG. 4A, the displacement in the torsion direction is detected by changes in the electrostatic capacitance of the four electrodes 211-1 to 211-4.

Figure 4B:
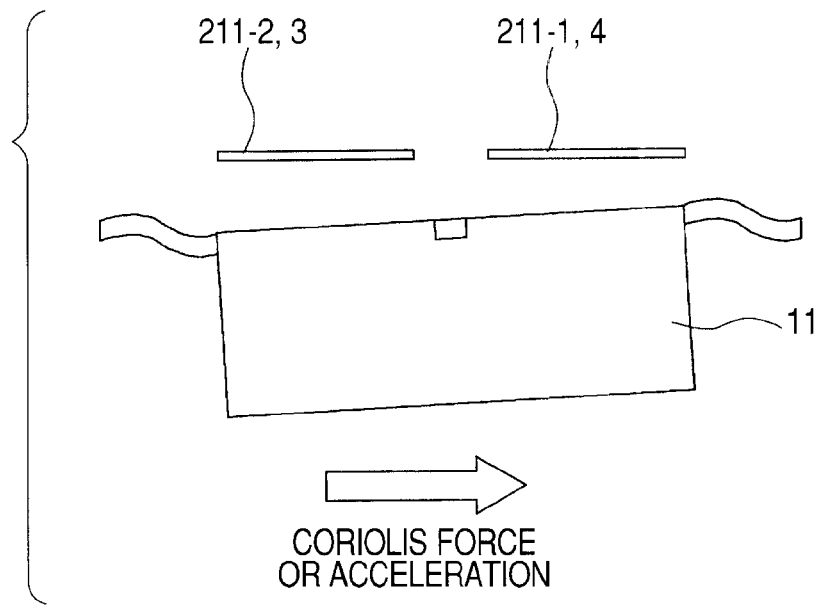

For example, as shown in FIG. 4B, among the four electrodes 211-1 to 211-4, the two electrodes 211-1 and 211-4 that are tilted and spaced to each other have reduced electrostatic capacitances C1 and C4, and the two electrodes 211-2 and 211-3 that are tilted and close to each other have increased electrostatic capacitances C2 and C3. The sum of the capacitances C1+C4 is taken on the widened sides, and the sum of the capacitances C2+C3 is taken on the narrowed sides. Then, the difference between the sums of the capacitances of the electrodes (C1+C4)−(C2+C3) is taken, whereby the displacement caused by the torsion, that is, the angular velocity can be detected efficiently.

In addition, when the angular velocity is applied around the second axis (for example, the Y-axis in the three dimensional coordinate system), a Coriolis force occurs in the first axis (for example, the X-axis in the three dimensional coordinate system) direction. Similarly, the angular velocity to be generated around the second axis can be detected by the changes in the electrostatic capacitance of the four electrodes 211-1 to 211-4. Therefore, the angular velocity of two axes can be detected.

Next, a method of detecting the acceleration will be shown.

Suppose the mass of the oscillator 11 is m, when the acceleration $\alpha$ in a predetermined direction is applied to the oscillator 11, a force, F=mα, is applied in the same direction as that of the acceleration α. In addition, since a displacement x of the elastic support 13 when the force is applied is expressed by F=kx, it is x∝α, and then, the displacement is detected to find the acceleration.

When the acceleration occurs around the first axis (for example, the X-axis in the three dimensional coordinate system), as similar to the case of the angular velocity, a moment caused by inertial force occurs, and a displacement occurs in the torsion direction. The displacement in the torsion direction is detected as changes in the electrostatic capacitance of the electrodes 211-1 to 211-4. The directions of the displacements caused by the acceleration around the first axis and the angular velocity around the second axis are the same. However, generally, it is sufficient to detect the acceleration up to 200 Hz at most. For the angular velocity, since it appears near the vibration frequency of the oscillator 11 (generally a few kHz to a few tens kHz), it can be easily separated by a filter, for example.

In addition, it is similar to the acceleration around the second axis (for example, the Y-axis in the three dimensional coordinate system).

Figure 6:
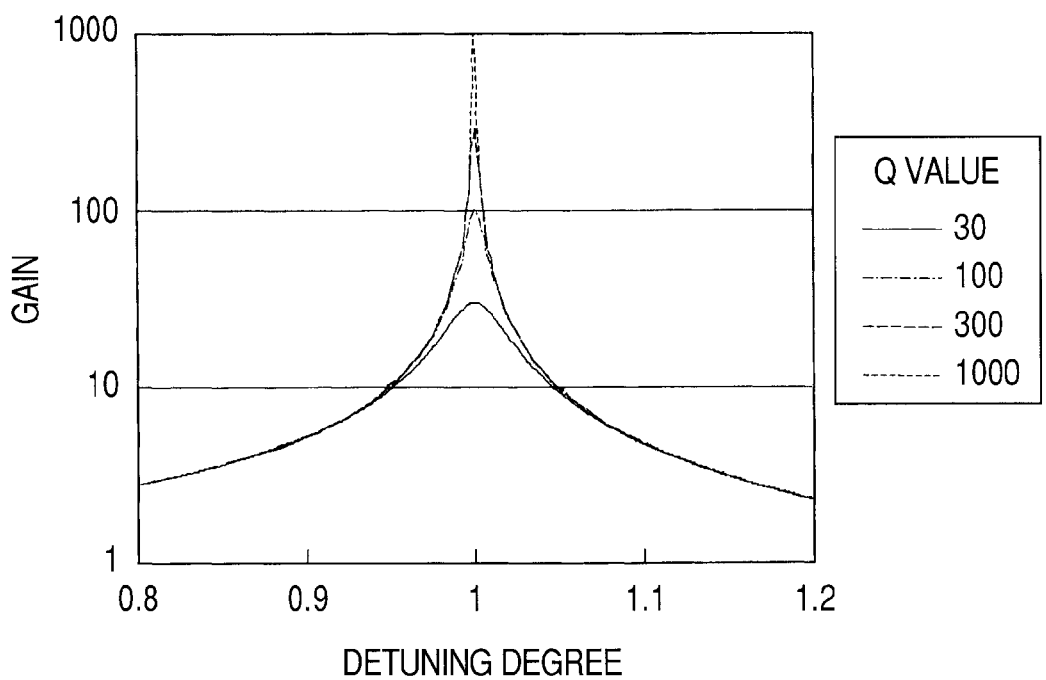
FIG. 6 shows a diagram depicting the relation between the gain and the detuning degree.
Figure 7:
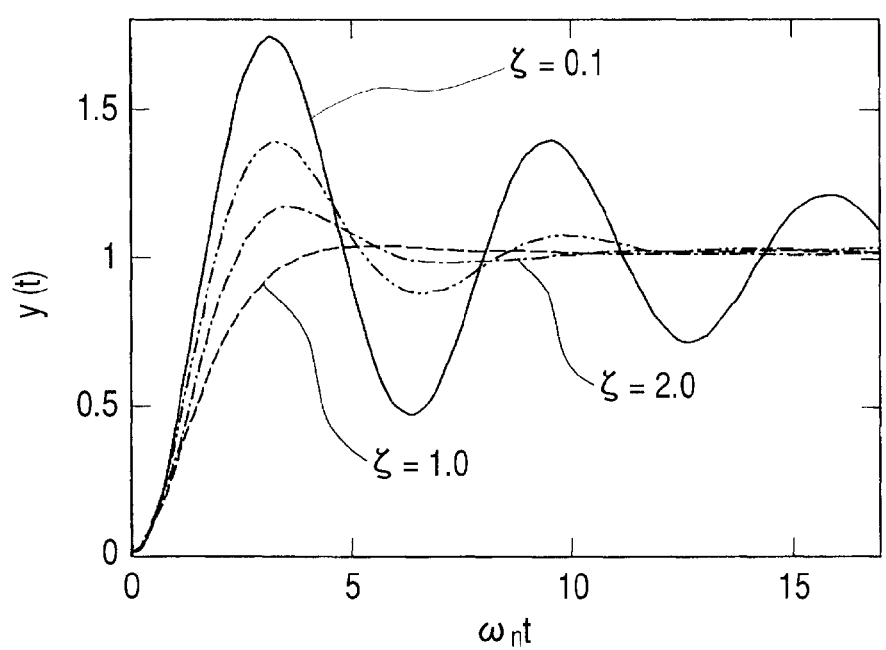
FIG. 7 shows a diagram depicting the step response of a viscosity damping system.

Generally, it is necessary to maintain the Q value on the detection side of the inertial sensor high to some extent, but no problem arises as long as it is greater than the gain value with the use of a mechanical coupling. For example, as shown in the equation shown in FIG. 5 and a diagram shown in FIG. 6 depicting the relation between the gain and the detuning degree (the ratio between the drive frequency and the detection frequency), for instance, when it is desired to obtain the gain ten times, it is necessary to set the detuning degree to 0.95 or 1.05. At this time, even though the Q value on the detection side is set greater than 10, the gain is little changed. Suppose in the case in which the detection Q value has been set to 100 or 1000 that is the value greater than the expected gain, the Q value on the detection side is included in the denominator of the transient term exp (−ωzt/2Q) when the angular velocity ω shown in FIG. 5 is applied. On this account, when the Q value is large, the damping ratio of the viscosity damping system is small, and thus it takes time for convergence. For reference, FIG. 7 shows the step response of the viscosity damping system.

Figure 8A:
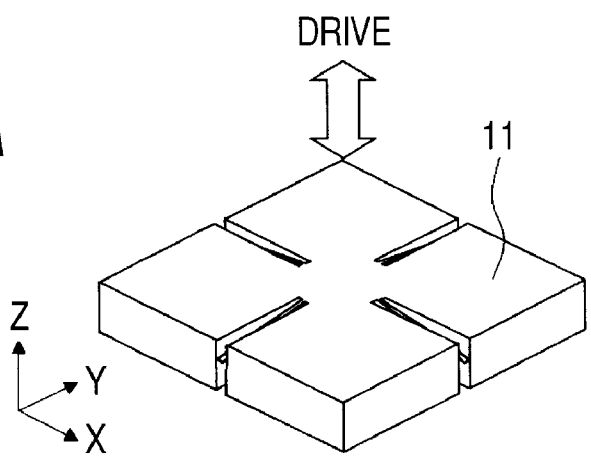
FIGS. 8A to 8C show schematic perspective views illustrative of the detection mode of the inertial sensor according to the first embodiment.
Figure 8B:
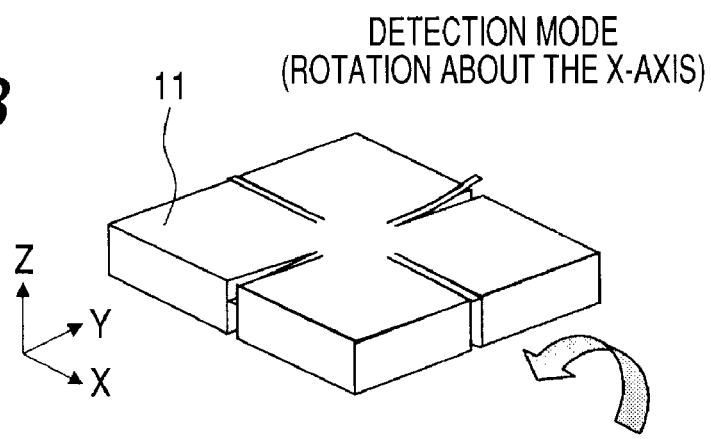
Figure 8C:
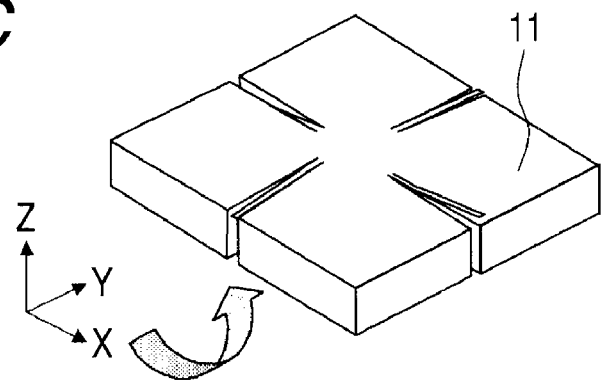

Next, FIG. 8A shows an exemplary drive mode in the inertial sensor which can detect the angular velocity and the acceleration in multi-axis at the same time, and FIGS. 8A and 8B show an exemplary detection mode in the inertial sensor.

The inertial sensor 1 according to an embodiment of the invention contrives in structure to greatly increase only the drive Q value and to vary the detection Q value not so much. In other words, the grooves or the through holes 15 (see FIG. 1A) are formed in the direction in parallel with the drive mode with respect to the inertial mass (the oscillator 11), whereby the drive Q value can be increased. In addition, the detection mode is in the rotating direction about the X-axis and the Y-axis, it does not have the benefit of the Q value due to the grooves or the through holes 15, rather the motion is hampered because of the existence of the grooves or the through holes 15, and the detection Q value is deceased. Therefore, an overshoot can be prevented at the time when the angular velocity is applied, while drive voltage and power consumption are being suppressed. Accordingly, an increase in the detection Q value can be suppressed, while the drive Q value is being increased.

After the inertial sensor 1 is fabricated by the semiconductor process, a ceramic package, for example, is used to subject it to vacuum encapsulation in an atmosphere lower than the atmospheric pressure. When a resonance of a few kHz to a few tens kHz like the inertial sensor 1 is used, it is known that the damping caused by the atmosphere is far greater than the structural damping such as internal loss. Therefore, vacuum encapsulation is performed to allow the improvement of the drive and detection Q values. At this time, for example, when the atmosphere is high vacuum of 1 Pa or below, it is necessary to secure the degassing and the robustness of the package, the load of the fabrication process is raised, and fabrication costs are increased. On the other hand, when the degree of vacuum is about 100 Pa or so, the influence of degassing due to heat treatment can be virtually ignored, and the package can be simplified.

Figure 9:
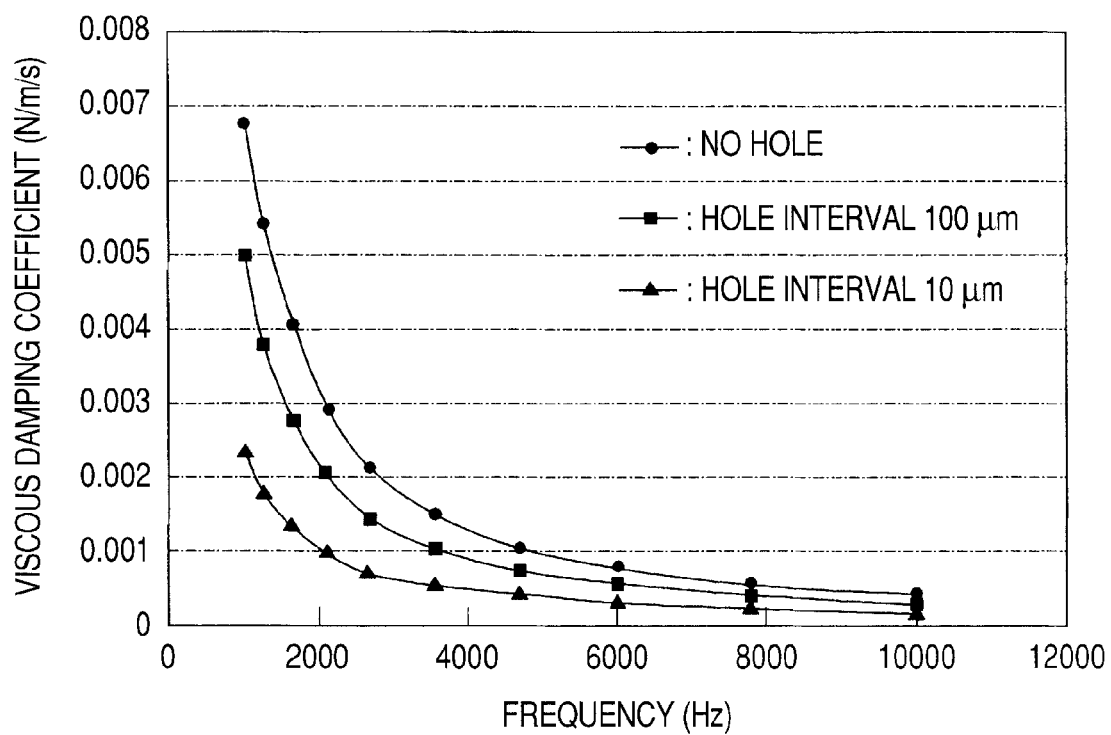
FIG. 9 shows a diagram depicting the simulation result for determining the relation between a viscous damping coefficient and a vibration frequency.

When the degree of vacuum is not raised, a problem arises that the drive Q value is not increased, rather the drive voltage rises. However, in the inertial sensor 1 according to an embodiment of the invention in which the oscillator is formed with the grooves or the through holes 15 (see FIG. 1A) in almost the same direction as the drive direction, the influence of the viscosity resistance of air is reduced, and the drive Q value can be increased. Here, FIG. 9 shows the simulation results in the cases in which the oscillator 11 has no through holes 15 and it is driven as in plane, and in which the oscillator 11 has the through holes 15 in the direction in parallel with the drive direction. In FIG. 9, the viscous damping coefficient is indicated on the vertical axis, and the frequency is indicated on the horizontal axis.

Figure 10A:
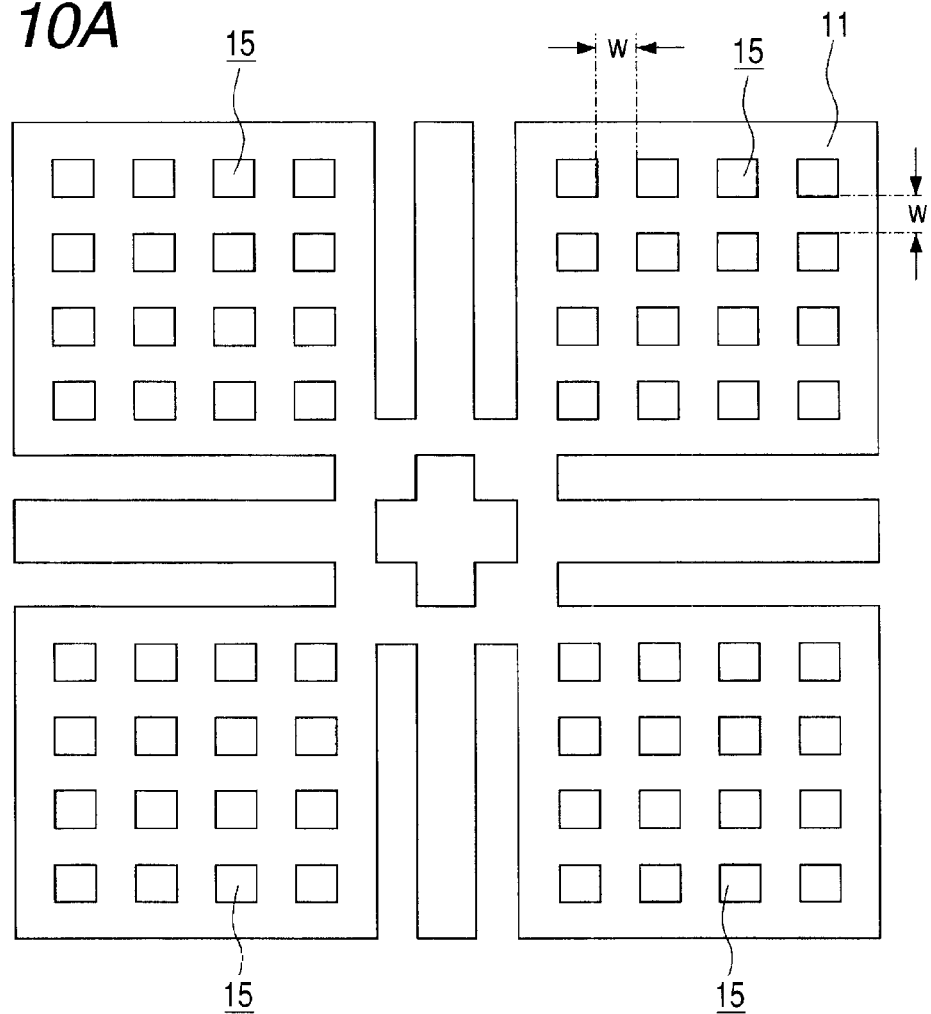
FIGS. 10A and 10B show diagrams depicting the simulation conditions.
Figure 10B:
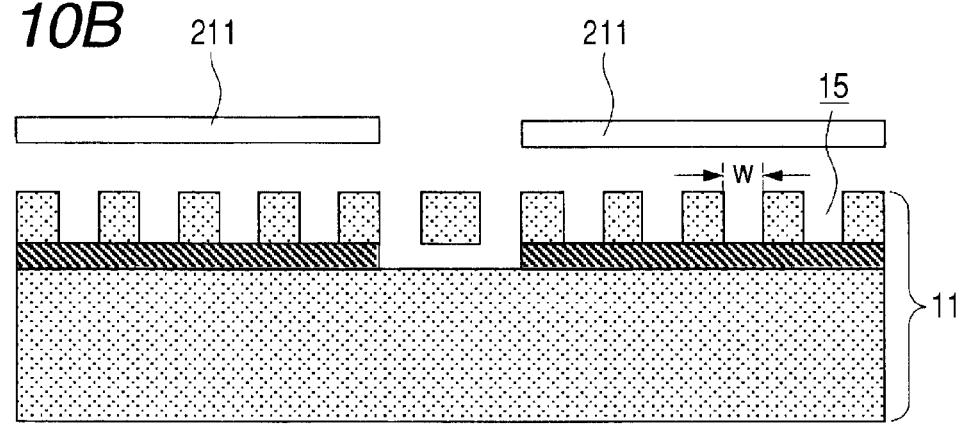

As shown in FIGS. 10A and 10B, the simulation result is the simulation in which the interval between the oscillator 11 and the electrode 13 disposed thereabove is 3 μm. Furthermore, in consideration of the convenience of the fabrication process, the through hole 15 was a hole having a depth of 22 μm, not a through hole. In addition, the width w of the line part between the holes was set to 10 μm and to 100 μm. In addition, as a comparative example, the case with no hole was shown.

As shown in FIG. 9, in comparison of the case of providing holes with the case of providing no holes, the viscous damping coefficient is reduced to about one-third in the case of providing holes, and thus the Q value is increased about three times. In addition, in the case in which the line part has a width of 10 μm, the viscous damping coefficient is more reduced than the case of a width of 100 μm. In other words, it is revealed that such holes are provided as many as possible, whereby the effect of a reduction in the viscous damping coefficient becomes great to increase the Q value. In addition, a through hole is formed instead of a hole, whereby such effect that is a few to a few tens times the effect can be obtained.

Here, more specifically, the ratio between the stationary term for drive and the transient term that will be a factor of an overshoot is checked. The ratio between the transient term and the stationary term shown in FIG. 5 is $\exp(-\omega s \cdot t/(2 \cdot Qs))$, if phase information is ignored. When the ratio is large, the ratio of the overshoot in the time period of interest is greater than the magnitude of the applied angular velocity. Since most of the response of a general angular velocity sensor is about 100 Hz, it is $\exp(-\omega s/(200 \cdot Qs))$, when the response for 0.01 second is considered. Assuming that the influence is small if the ratio of the amplitude is 10% of the stationary term or smaller, the condition is $\exp(-\omega s/(200 \cdot Qs)) < 0.1$. More specifically, if the detection frequency ωs is 2 kHz, the upper limit of Qs is 27, and the upper limit of Qs is 143, if the detection frequency is 10 kHz.

Next, an embodiment of a fabrication method of the inertial sensor according to an embodiment of the invention (a first embodiment of the fabrication method) will be described with reference to FIGS. 11A to 15. FIGS. 11A to 15 show exemplary fabrication process steps of the inertial sensor 1 formed of the multi-axis complex sensor including the angular velocity sensor described in the first embodiment.

Figure 11A:
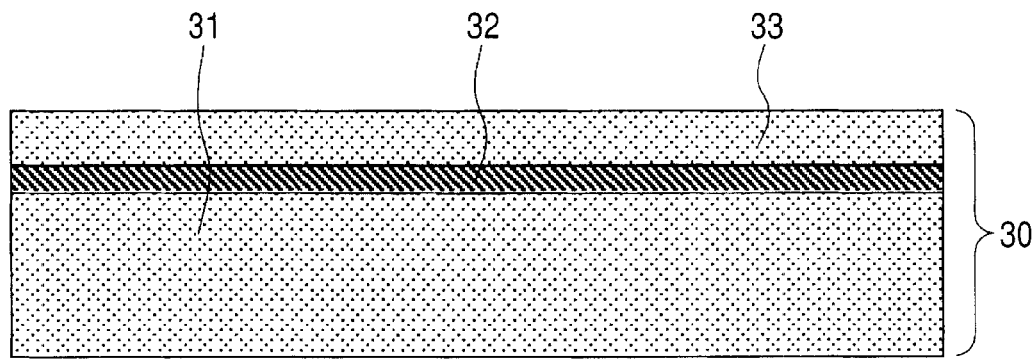
FIGS. 11A to 11C show schematic cross sections of fabrication process steps of an embodiment (the first embodiment) of the fabrication method of an inertial sensor according to the invention.

As shown in FIG. 11A, a substrate 30 is used which has a three layer structure in which a first layer 31, a second layer 32, and a third layer 33 are in turn laminated. For the substrate 30, an SOI substrate is named. Here, such a substrate was used in which the first layer 31 to be a lower layer was a silicon layer, the second layer 32 was an insulating layer, and the third layer 33 to be an upper layer was a silicon layer. For the insulating layer, an insulator such as silicon oxide or silicon nitride may be used. Here, the first and second layers 31 and 32 on both sides have conductivity. For example, conductivity is provided by doping an n-type impurity or a p-type impurity. In addition, the third layer 33 to be the upper layer is formed thinner than the first layer 31 to be the lower layer. This is because the elastic support is formed of the silicon layer of the upper layer, which is formed thinner to have flexibility when a predetermined thickness is reached. The first layer 31 to be the lower layer is formed thicker for forming a mass part (the oscillator).

Figure 11B:
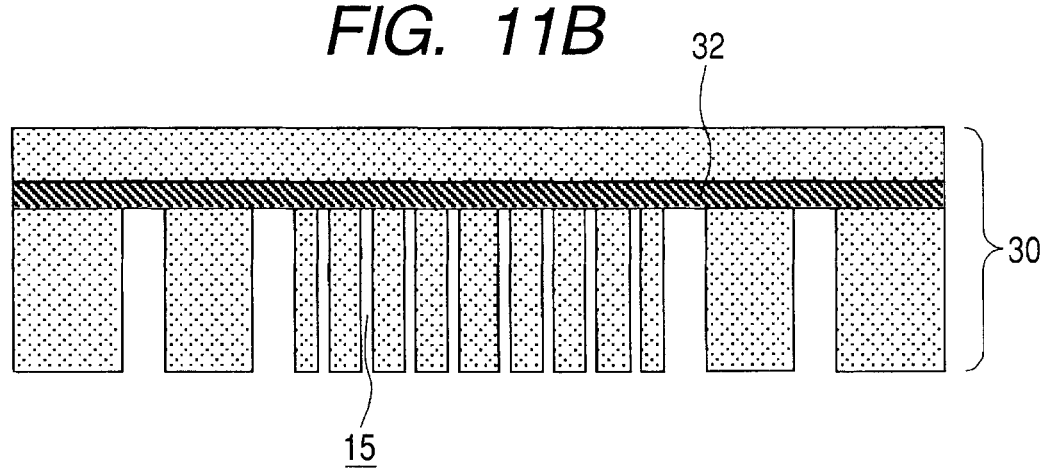

The substrate (SOI substrate) 30 is processed to fabricate the multi-axis sensor. First, as shown in FIG. 11B, the under surface of the substrate 30 is subjected to reactive ion etching to remove the first layer 31 to divide into predetermined blocks. In the process steps, the through holes 15 are formed in the drive direction, that is, in parallel with the third axis. In the etching process step, since there is a sufficient etching selection ratio between the silicon oxide layer and the silicon layer, the second layer (silicon oxide layer) 32 can be used as an etching stopper.

Figure 11C:
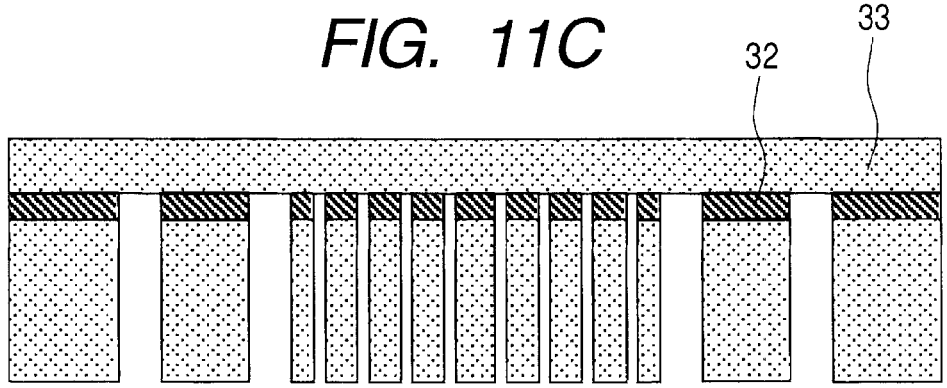

Subsequently, as shown in FIG. 11C, the second layer (silicon oxide layer) 32 is etched to remove the silicon oxide layer. At this time, the upper third layer (silicon layer) 33 serves as an etching stopper.

Figure 12A:
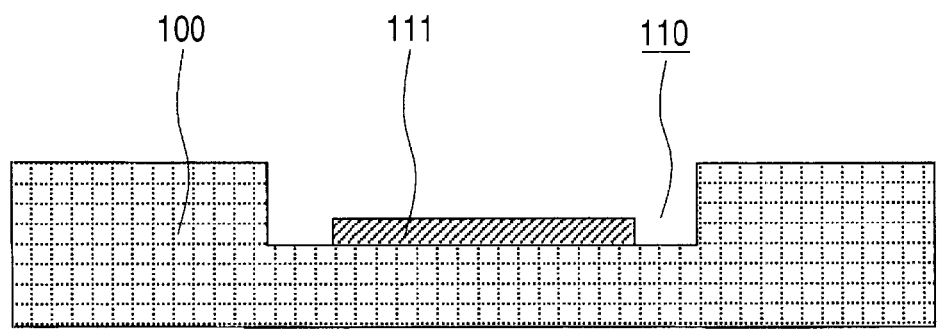
FIGS. 12A and 12B show schematic cross sections of fabrication process steps of an embodiment (the first embodiment) of the fabrication method of an inertial sensor according to the invention.

Subsequently, as shown in FIG. 12A, a first substrate 100 to be a lower substrate is prepared. The first substrate 100 is formed with a groove 110, and the groove 110 is formed with an electrode 111.

Figure 12B:
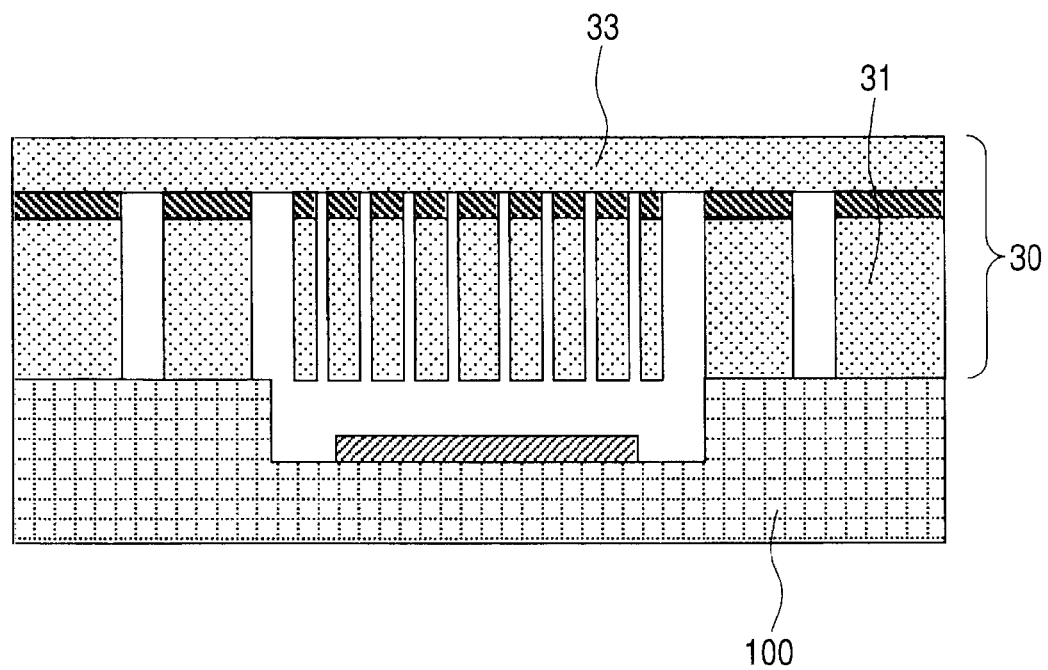
Figure 13A:
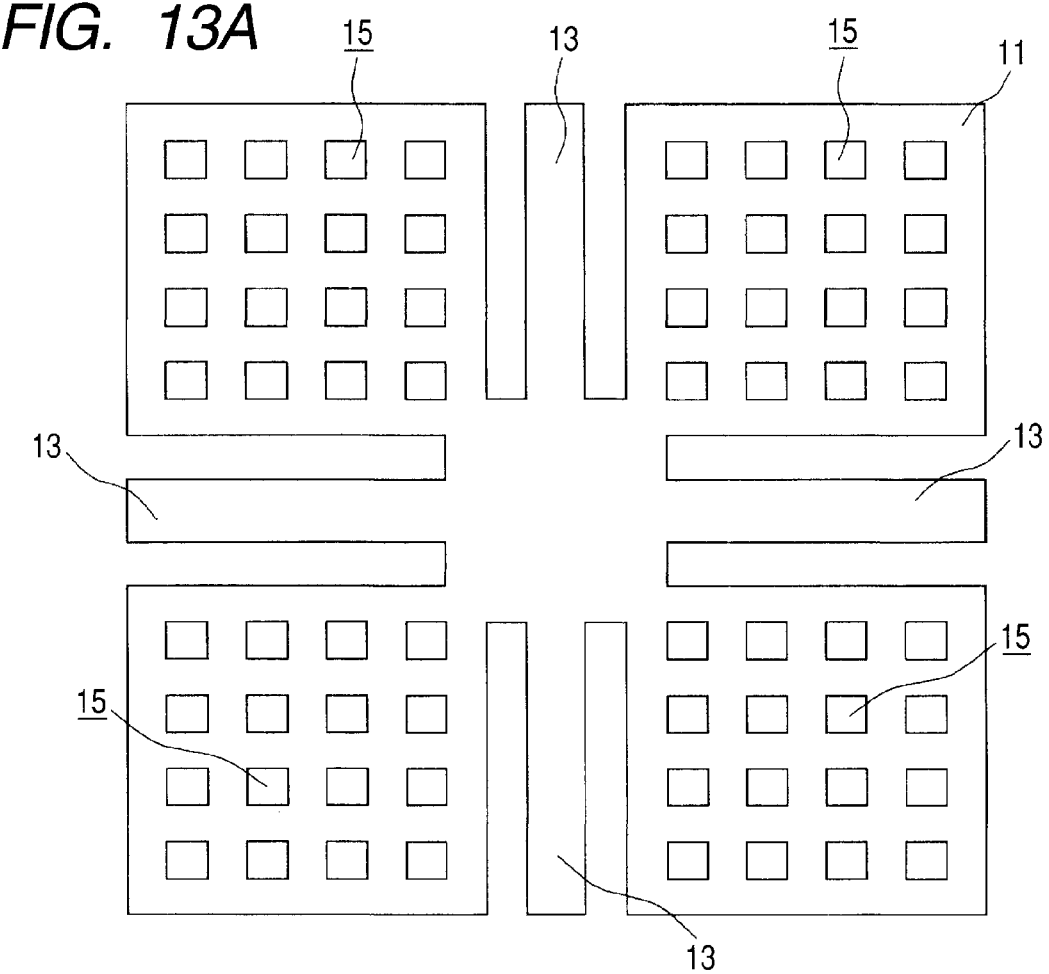
FIGS. 13A and 13B show a plan view and a schematic cross section depicting an embodiment (the first embodiment) of the fabrication method of an inertial sensor according to the invention.
Figure 13B:
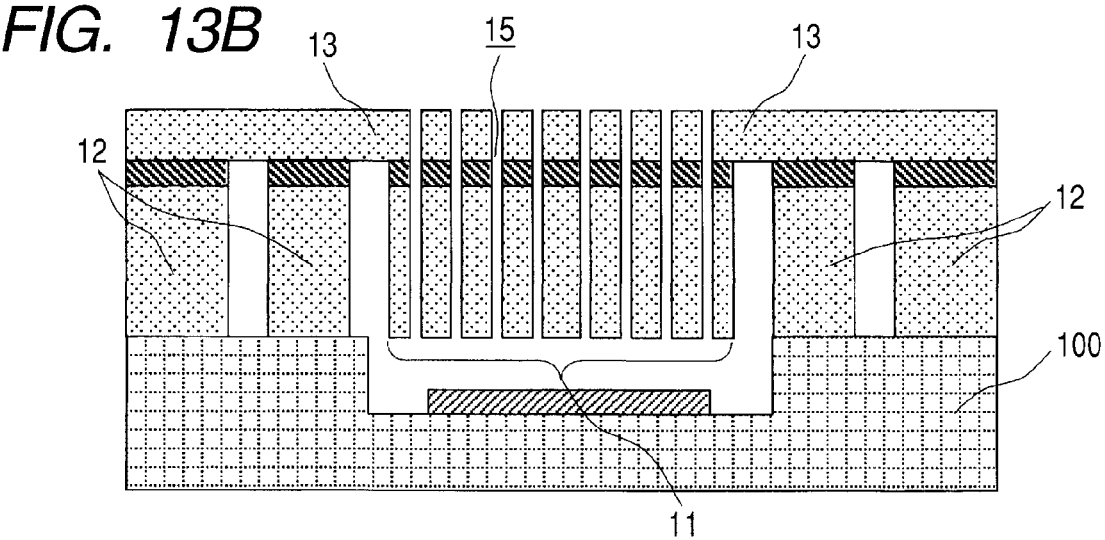

Subsequently, as shown in FIG. 12B, the first substrate 100 is joined to the under surface of the first layer 31 of the substrate 30. For this junction, for example, anodic bonding is used. Schemes such as silicon-silicon oxide film junction, silicon-silicon junction, and metal-metal junction may be used.

Subsequently, a mask, which covers the elastic support and a part of the oscillator to be the mass part, is used to selectively etch the third layer 33 from the top surface of the upper third layer 33. At this time, holes (not shown) are formed in the drive direction, that is, in parallel with the third axis. Consequently, as shown in a plan view shown in FIG. 13A and a schematic cross-section in FIG. 13B, the oscillator 11, the elastic supports 13 which support the oscillator 11, and the support parts 12 which support the elastic supports 13 are formed on the first substrate 100, and the structure is obtained in which a plurality of the through holes 15 is formed in the oscillator 11.

Figure 14:
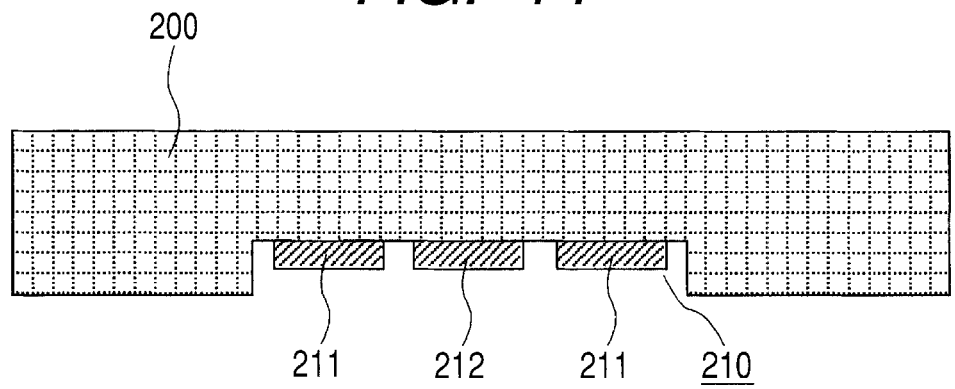
FIG. 14 shows a schematic cross section of fabrication process steps of an embodiment (the first embodiment) of the fabrication method of an inertial sensor according to the invention.

Subsequently, as shown in FIG. 14, a second substrate 200 is prepared to process a groove 210 for wiring on the under surface side. For this process, schemes such as typical silicon etching may be used. Moreover, electrodes (the detection electrode) 211 and an electrode (the drive electrode) 212 are formed in the groove 210.

Figure 15:
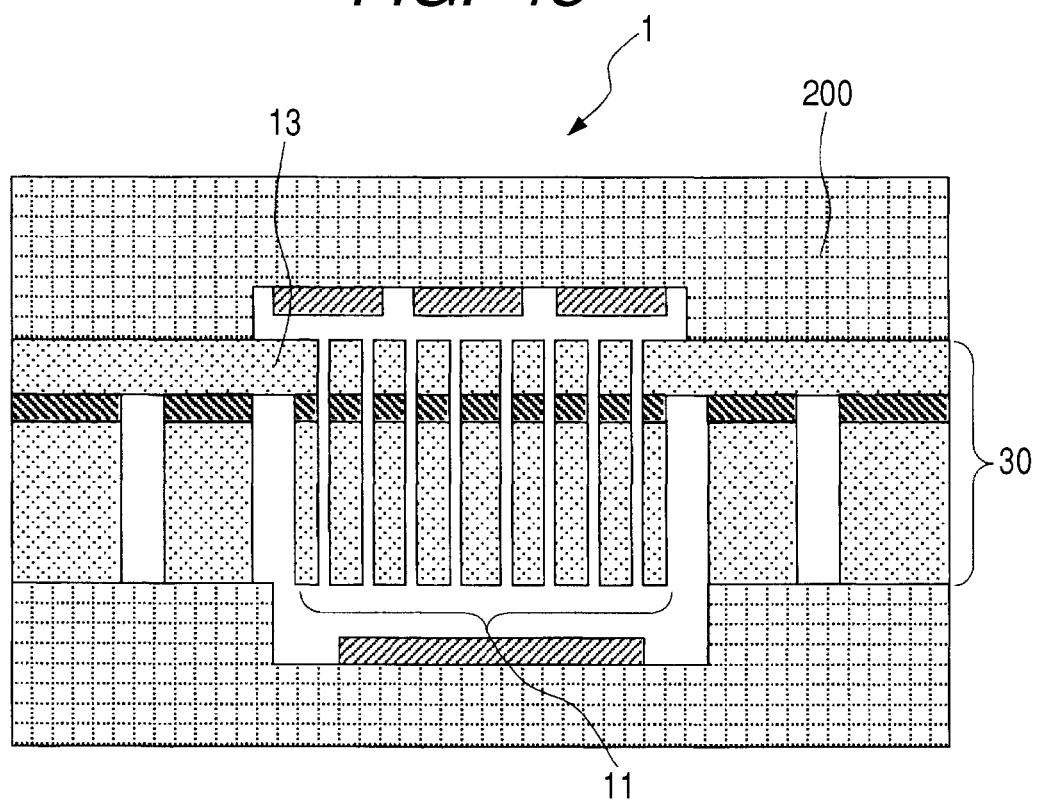
FIG. 15 shows a schematic cross section of fabrication process steps of an embodiment (the first embodiment) of the fabrication method of an inertial sensor according to the invention.

Subsequently, as shown in FIG. 15, the second substrate 200 is joined to the substrate 30 formed with the oscillator 11, the elastic supports 13 and so on, using a junction scheme such as anodic bonding. Here, the second substrate 200 is formed with a plurality of weight shaped through holes (not shown), through which the lower silicon conductive layer can be observed. Here, metal such as gold is vapor deposited on the top surface of the second substrate 200, and a metal layer is deposited on the wall surface of the weight shaped through holes to form terminals for wiring. Then, an undesired metal film is removed by etching, whereby the inertial sensor 1 shown in the drawing is obtained. After that, the inertial sensor 1 is mounted on a package, although it is not shown.

According to the fabrication method of the inertial sensor 1, the Q value can be increased even though the degree of vacuum is close to the atmospheric pressure. Therefore, the influence of a gas leakage into the package from outside or gas generated inside the package can be prevented. Thus, such advantages can be obtained that the airtight structure of the package can be simplified, and that the cost of the package can be decreased. In addition, as compared with the case in which the degree of vacuum is raised to increase the Q value, an increase in the Q value on the detection side can be suppressed. Therefore, such advantages can be provided that the time period for stable state of the damping oscillation is shortened at the time when the angular velocity is applied, and that the signal-to-noise ratio and the response of the inertial sensor are improved.

Figure 16:
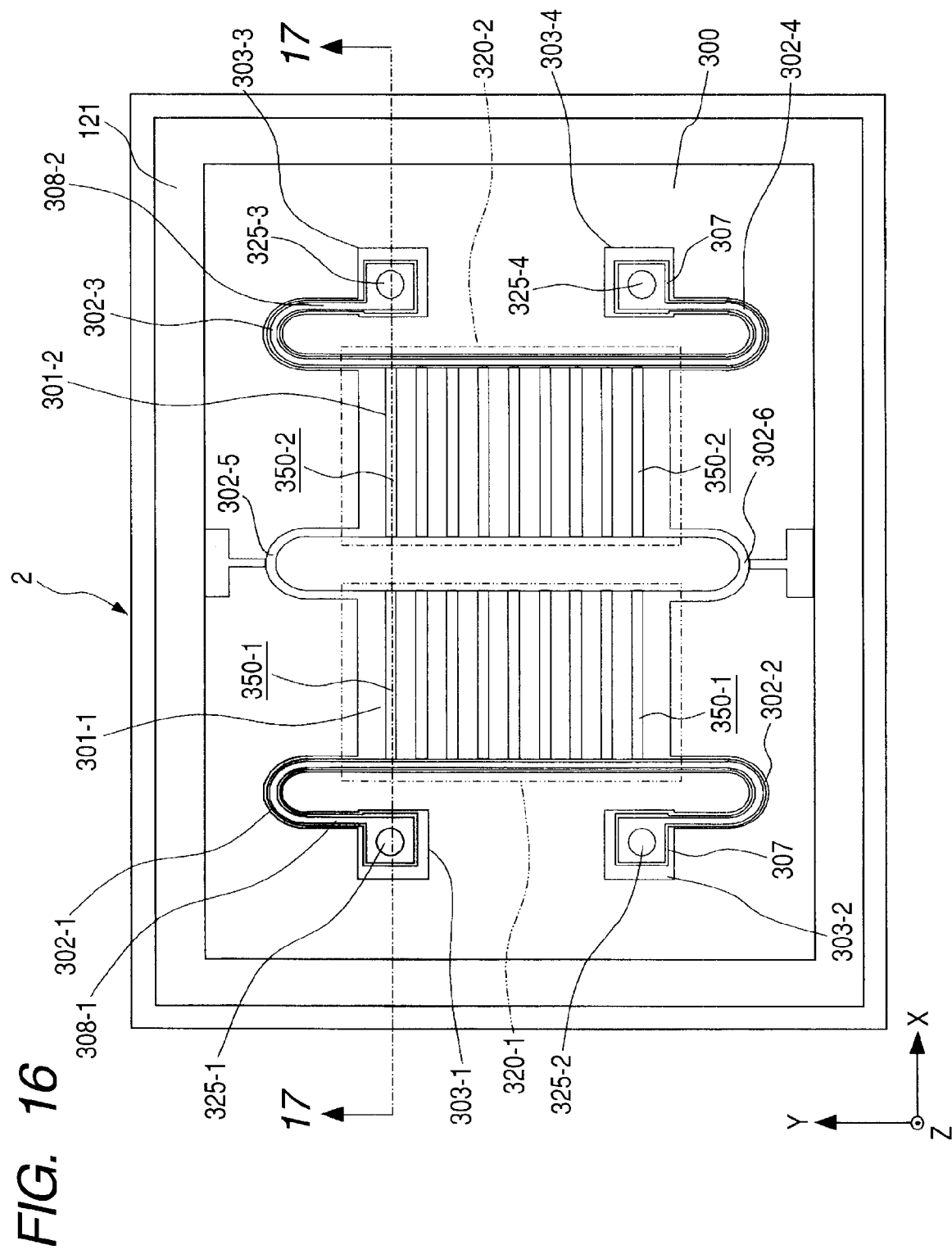
FIG. 16 shows a plan layout depicting an embodiment (a second embodiment) of the inertial sensor according to the invention.

Next, an embodiment (a second embodiment) of the inertial sensor according to the invention will be described with reference to FIGS. 16 and 17. FIGS. 16 and 17 show an exemplary inertial sensor formed of a single axis angular velocity sensor. FIG. 16 shows a plan layout depicting the inertial sensor, and FIG. 17 shows a cross section schematically depicting the configuration at line 17-17 shown in FIG. 16.

As shown in FIGS. 16 and 17, an inertial sensor 2 has a first oscillator 301-1 and a second oscillator 301-2 in parallel with each other. For example, the first oscillator 301-1 is the oscillator on the drive side, and the second oscillator 301-2 is the oscillator on the excitation side. Both of the first oscillator 301-1 and the second oscillator 301-2 are formed of a rectangular thin film, and are formed of silicon, for example. Then, on the top surface of the first oscillator 301-1 and the top surface of the second oscillator 301-2, grooves 350-1 and 350-2 are formed in the direction in parallel with the drive direction. The grooves 350-1 and 350-2 may be formed on the under surface of the first and second oscillators 301-1 and 301-2, or may be on both surfaces thereof. In addition, when the oscillator has a thickness to form the grooves, they may be formed on the side surface thereof.

The first oscillator 301-1 and the second oscillator 301-2 are connected to each other in such a way that the corner parts thereof facing to each other are connected by elastic supports 302-5 and 302-6 and the corner parts of the first oscillator 301-1 opposite to the second oscillator 301-2 are supported by the one ends of elastic supports 302-1 and 302-2. Furthermore, the other ends of the elastic supports 302-1 and 302-2 are supported and fixed to support parts 303-1 and 303-2. In addition, the corner parts of the second oscillator 301-2 opposite to the first oscillator 301-1 are supported by one ends of elastic supports 302-3 and 302-4. Moreover, the other ends of the elastic supports 302-3 and 302-4 are supported and fixed to the support parts 303-3 and 303-4. For example, the elastic supports 302-1 to 302-6 are configured of a plate spring individually, and formed of silicon in a U-shape, for example. The support parts 303-1, 303-2, 303-3, and 303-4 are formed on the first substrate 300 (which corresponds to the substrate 10). Therefore, the first oscillator 301-1 and the second oscillator 301-2 are supported only by the elastic supports 302-1, 302-2, 302-3, and 302-4, and completely floated over the first substrate 300.

An electrode 308-1 is disposed which passes from the support part 302-1, the elastic support 302-1, the first oscillator 301-1, the elastic support 302-2 to the support part 303-2 and which electromagnetically drives the first oscillator 301-1 through an insulating film 307. Similarly, an electrode 308-2 is disposed which passes from the support part 302-3, the elastic support 302-3, the first oscillator 301-2, the elastic support 302-4 to the support part 303-4 and which detects the excitation of the second oscillator 301-2 through an insulating film 307.

A magnet 500 is disposed on the back side of the first substrate 300 opposite to the surface on which the oscillator 301 is formed.

On the first substrate 300, a second substrate 400 is formed through a frame part 321. For example, the second substrate 400 is formed of a glass substrate. A detection electrode 320-1 is formed on the surface of the second substrate 400 opposite to the first substrate 300, which is formed at the position facing to the electrode 308-1 formed on the first oscillator 301-1. A detection electrode 320-2 is formed at the position facing to the electrode 308-2 formed on the second oscillator 301-2.

Moreover, on the second substrate 400, lead electrodes 324-1 and 324-2 (not shown) are formed which are connected to the electrode 308-1 on the support parts 303-1 and 303-2 and which lead the electrode 308-1 to outside through contact parts 325-1 and 325-2. Lead electrodes 324-3 and 324-4 (not shown) are formed which are connected to the electrode 308-2 on the support parts 303-3 and 303-4 and which lead the electrode 308-2 to outside through contact parts 325-3 and 325-4.

The inertial sensor 2 is electromagnetically driven by the magnet 500 disposed under the first substrate 300. In the first embodiment, the magnet 500 is disposed under the first substrate 300, but it may be disposed by providing a hole in the first substrate 300 to place the magnet 500 therein, or by placing it above the second substrate 400. In addition, the magnet 500 may be placed on both of the first substrate 300 and the second substrate 400. With these configurations, the same results can be obtained as the operation, although there are differences more or less in the output of magnetic flux density. For the electrode for electromagnetic drive, the current is carried through the electrode 308 on the oscillator 301.

Hereinafter, the operational principles of the inertial sensor 2 will be described.

Through the electrode 308-1 on the oscillator (the first oscillator 301-1) on the drive side, ac current with some cycles is carried. Since the current has periodicity, the direction carried might be inverted at another point in time. When current is carried through the electrode, the Lorentz force occurs in the X-direction from a magnetic field generated from the magnet 500 disposed under the first substrate 300.

The Lorentz force $F_{lorentz}$ is expressed by an equation $F_{lorentz}=IBL$ where the current carried through the electrode is I, the magnetic flux density is B, and the length of the electrode wiring is L. The force is induced in the direction orthogonal to the wiring. The Lorentz force is applied to the oscillator with the same periodicity as that of the current to be applied. The first oscillator 301-1 on the drive side has fixed points to be the support parts 303-1 and 303-2 connected to the elastic supports 302-1 and 302-2, and periodically repeats the motion.

The frequency of the vibration mode is properly selected, whereby the other second oscillator 301-2 has fixed points to be the support parts 303-3 and 303-4 connected to the elastic supports 302-3 and 302-4, and repeats the motion while it has a certain phase shift. At this time, when the angular velocity is externally applied about the Y-axis, the Coriolis force occurs in the direction orthogonal to the vibration direction. The Coriolis force $F_{coriolis}$ is expressed by an equation $F_{lorentz}=2mv\Omega$, where the mass of the oscillator is m, the vibration velocity in the drive direction is v, and the angular velocity that is externally applied is $\Omega$.

In order to take a great displacement caused by the Coriolis force, it is necessary to take a great drive displacement xm. In addition, in the case of electromagnetic drive, since a comb tooth electrode is not necessary that is necessary in electrostatic drive, a great displacement can be taken.

When the Coriolis force occurs, the oscillator 301 oscillates in the Z-axis direction. At this time, the detection electrodes 320-1 and 320-2 are disposed on the first and second oscillators 301-1 and 301-2, respectively, whereby a change in capacitance occurs between the electrodes. Here, the frequency to apply voltage is controlled, and the first and second oscillators 301-1 and 301-2 are driven in the X-direction in the antiphase. Therefore, with respect to the Z-direction, the oscillator (for example, the first oscillator 301-1) is displaced in the direction coming to the detection electrode 320-1, where as the other oscillator (for example, the second oscillator 301-2) is displaced in the direction going to the detection electrode 320-2. The difference in capacitance is detected to compute the angular velocity to be applied. In other words, the first angular velocity sensor 1 is driven along the X-axis, and it detects the angular velocity about the Y-axis as a change in the capacitance in the Z-axis direction. Furthermore, since the first and second oscillators 301-1 and 301-2 oscillate in the antiphase, there might be an opposite case.

When the angular velocity is applied, the amount of a change in the capacitance that occurs between the detection electrode 320 and the oscillator 301 is varied, but when the acceleration is applied, the amount of a change in the capacitance occurring there between is not varied ideally. Thus, no capacitance difference occurs even though a difference is taken. Therefore, such a structure is provided that can remove the acceleration components.

The removal of the acceleration components will be described. In the steady state, C1=C2=C, and thus the difference in capacitance C1−C2=0, causing no capacitance difference, where the initial capacitance is C, the capacitance generated between the detection electrode 320-1 and the first oscillator 301-1 is C1, and the capacitance generated between the detection electrode 320-2 and the second oscillator 301-2 is C2.

Subsequently, when the angular velocity is applied, C1>C, C2<C (or C1<C, C2>C depending on the drive direction), and thus the difference in capacitance is |C1−C2|>0, causing a capacitance difference.

Then, when the acceleration is applied, C1>C, C2>C (or C1<C, C2<C, depending on the direction to apply the acceleration), and C1=C2, and thus the difference in capacitance is |C1−C2|=0, causing no capacitance difference. Therefore, the acceleration components are removed.

In addition, in reading a change in the capacitance, a carrier wave (+V sin ωt, −V sin ωt) is superimposed between the electrode 320 and the oscillator 301 on the second substrate 400, and the electric charge caused by the change in the capacitance between (C1−C2) is amplified by an amplifier, whereby actual signals are extracted. The carrier wave (+V sin ωt, −V sin ωt) is removed by carrier wave synchronous detection. For the drive wave, the drive signal itself is extracted by drive synchronous detection, or the direct current signal corresponding to the angular velocity is extracted by detecting it with the cycle component of a drive monitoring module such as induced electromotive voltage.

After the inertial sensor 2 is fabricated by semiconductor process, a ceramic package is used to subject the inertial sensor to vacuum encapsulation into an atmosphere lower than the atmospheric pressure. When a resonance of a few kHz to a few tens kHz is used like the inertial sensor 2, it is known that the damping caused by the atmosphere is far greater than the structural damping such as internal loss. Therefore, vacuum encapsulation is performed to allow the improvement of the drive and detection Q values. At this time, for example, when the atmosphere is high vacuum of 1 Pa or below, it is necessary to secure the degassing and the robustness of the package, the load of the fabrication process is increased, and fabrication costs are raised. On the other hand, when it is a degree of vacuum of about 100 Pa or so, the influence of degassing due to heat treatment can be virtually ignored, and the package can be simplified.

When the degree of vacuum is not increased, a problem arises that the drive Q value is not increased, rather the drive voltage rises. However, in the inertial sensor 1 according to an embodiment of the invention, the oscillator 301 is formed with the grooves 350 in the direction in parallel with the drive direction. Therefore, the difference of the viscous damping coefficients can be provided in structure in the individual modes such as the drive mode and the detection mode. In other words, the oscillator to be the inertial mass is formed with the grooves 350 in the direction in parallel with the drive mode, whereby the influence of the viscosity resistance of air is reduced, and the drive Q value can be increased. In addition, the detection mode is in the rotating direction about the X-axis and the Y-axis in parallel with the surface of the substrate, it does not have the benefit of the Q value due to the formation of the grooves 350, rather the motion is hampered because of the existence of the grooves 350, and the detection Q value is decreased. Therefore, an overshoot can be prevented at the time when the angular velocity is applied, while drive voltage and power consumption are being suppressed. Accordingly, an increase in the detection Q value can be suppressed, while the drive Q value is being increased.

Next, an embodiment of the fabrication method (a second embodiment of the fabrication method) of an inertial sensor according to the invention will be described with reference to FIGS. 18A to 24. FIGS. 18A to 24 show exemplary fabrication process steps of an inertial sensor 2 described in the second embodiment. FIGS. 18A to 24 depict them along line 17-17 shown in FIG. 16.

Figure 18A:
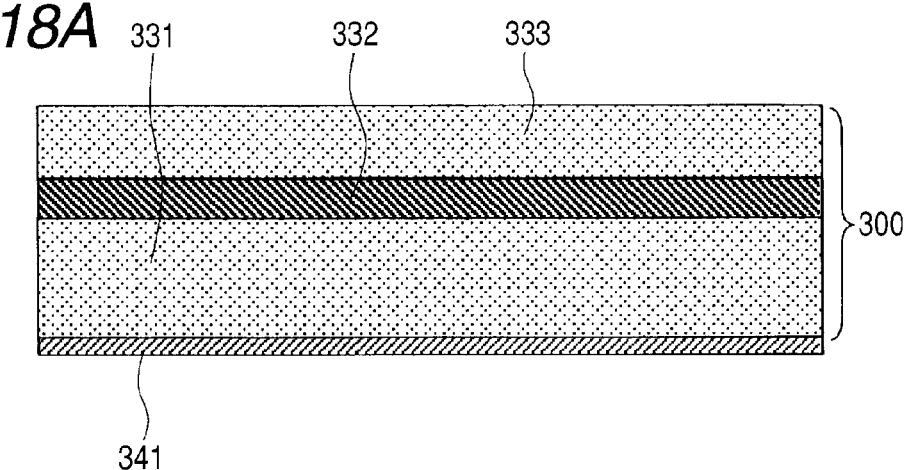
FIGS. 18A to 18C show schematic cross sections of fabrication process steps of an embodiment (the second embodiment) of the fabrication method of an inertial sensor according to the invention.

As shown in FIG. 18A, a substrate 300 is prepared for forming the oscillator, the elastic support and so on. For the substrate 300, an SOI (silicon on Insulator) substrate is used in which a silicon oxide layer 332 is sandwiched between a silicon layer 331 and a silicon layer 333. In addition, on the under surface of the substrate 300, a mask layer 341 is formed which is a mask in forming alignment marks in the subsequent process steps.

Figure 18B:
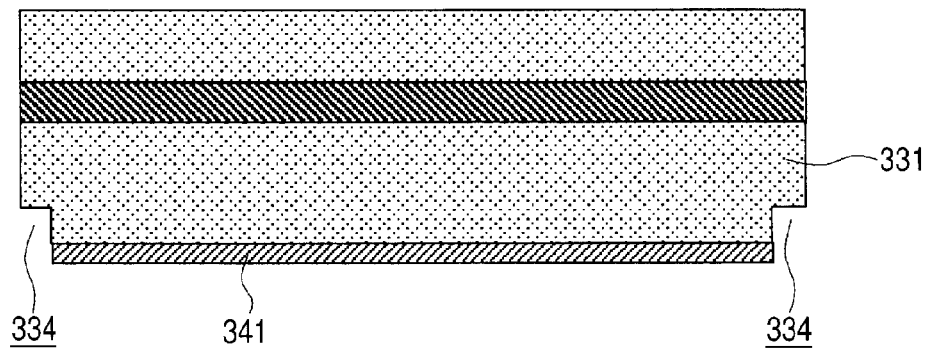

First, as shown in FIG. 18B, the mask layer 341 is used for an etching mask to form the alignment marks for alignment of first and second substrates, described later, and dicing lines 334 on the silicon layer 331. These are marks for alignment in anodic bonding of the first substrate and the second substrate, described later, and in cutting the inertial sensor 2.

Figure 18C:
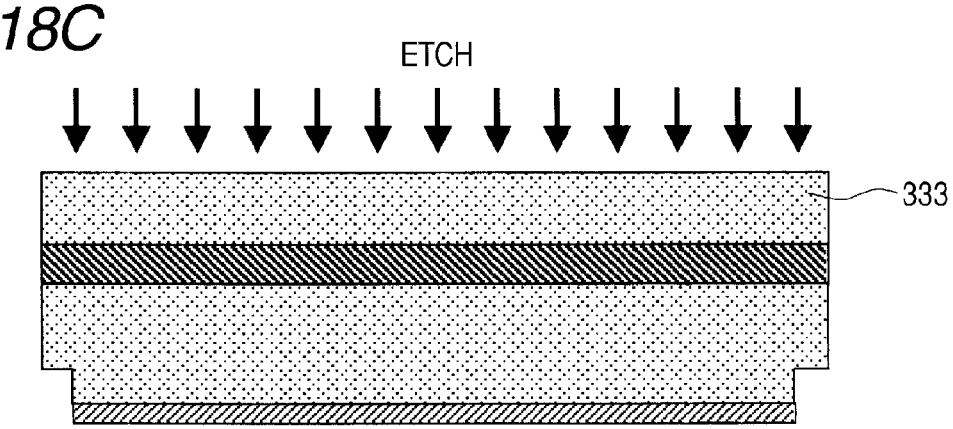

Subsequently, as shown in FIG. 18C, the upper silicon layer 333 is etched throughout the surface of the substrate so as to have a desired film thickness. For the etching method, it may be wet etching using tetramethylammonium hydroxide (TMAH) or potassium hydroxide (KOH) aqueous solution, or may be chemical and physical dry etching. In addition, when a desired film thickness is known in advance, such an SOI substrate may be prepared.

Figure 19A:
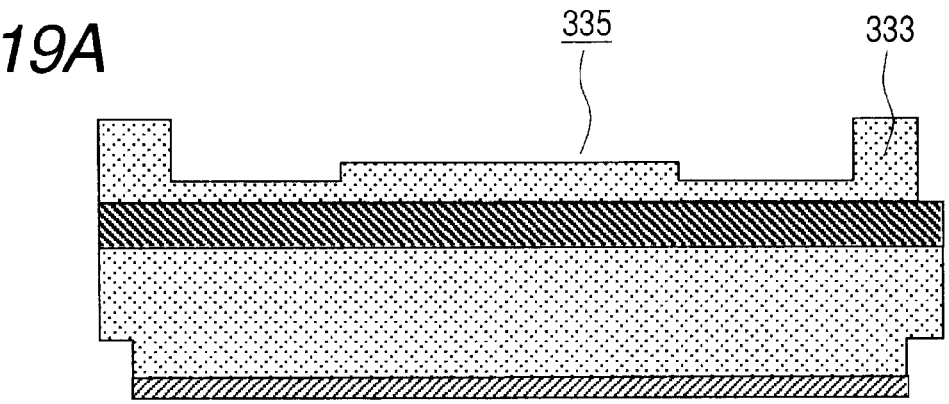
FIGS. 19A to 19C show schematic cross sections of fabrication process steps of an embodiment (the second embodiment) of the fabrication method of an inertial sensor according to the invention.

Subsequently, as shown in FIG. 19A, the silicon layer 333 is etched to form a frame for anodic bonding, and a salient 335 is formed. For the etching method, it may be wet etching using tetramethylammonium hydroxide (TMAH) or potassium hydroxide (KOH) aqueous solution, or may be chemical and physical dry etching. In this etching, the film thickness of the oscillator and the film thickness of the elastic support are decided.

Figure 19B:
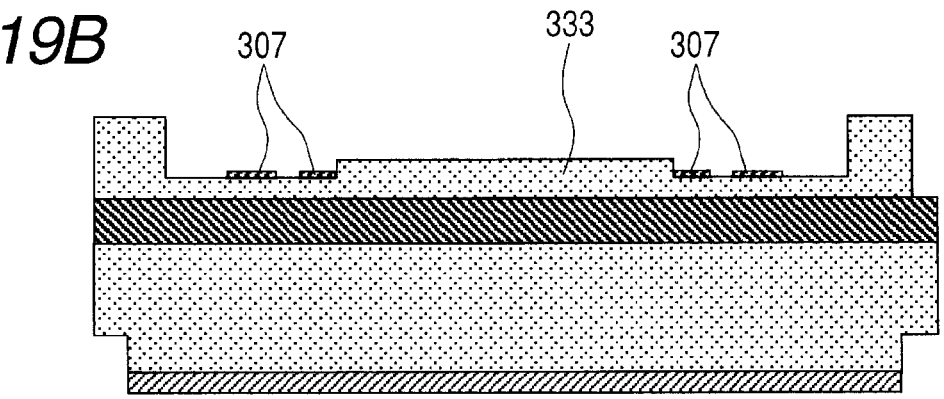

Subsequently, as shown in FIG. 19B, an insulating layer 307 is formed on the part of the area to form the oscillator and on the area to form the elastic support. For the insulating layer 307, it may be formed of silicon oxide ($SiO_2$) or silicon nitride (SiN) as long as it maintains the insulating properties between the silicon layer 333 and electrodes to be next formed.

Figure 19C:
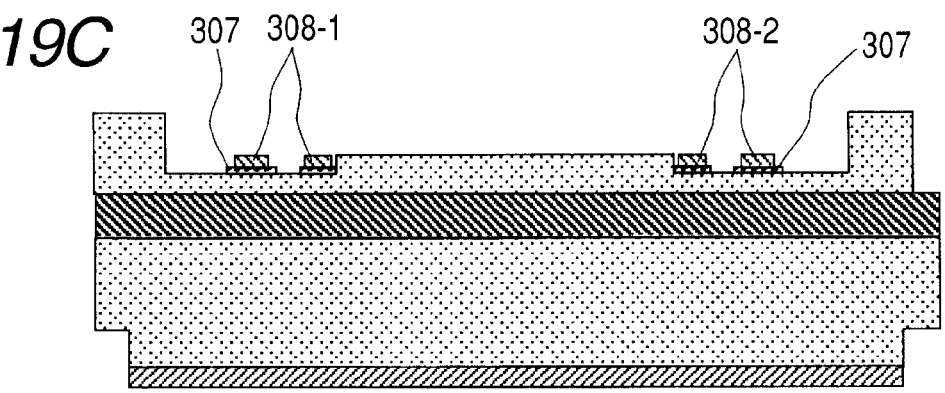

Subsequently, as shown in FIG. 19C, on the insulating layer 307, a wiring 308-1 for applying the Lorentz force and a wiring 308-2 for detecting induced electromotive force are formed. The material wiring was formed by electron beam vapor deposition. In the embodiment, the wiring is formed by lift-off, but the wiring may be etched by wet etching or dry etching. Moreover, in the embodiment, for the material wiring, a three layer metal material of gold, platinum and chromium is used, but a three layer metal material of gold, platinum and titanium, a two layer metal material of gold and chromium, or platinum and chromium, or gold and titanium, or platinum and titanium may be used, or a multilayer material of titanium nitride and titanium may be used instead of titanium. In addition, copper may be used instead of chromium or titanium. Moreover, for the forming method, spattering or CVD may be used.

Figure 20A:
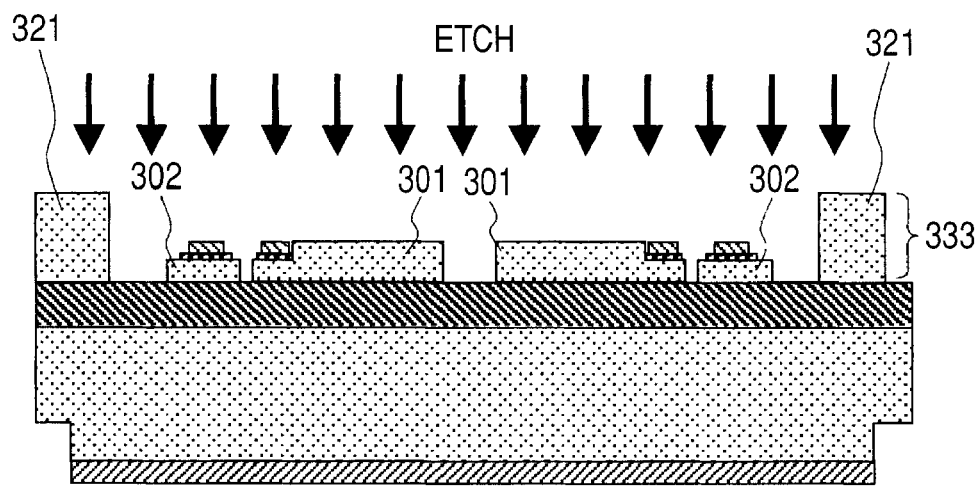
FIGS. 20A and 20B show schematic cross sections of fabrication process steps of an embodiment (the second embodiment) of the fabrication method of an inertial sensor according to the invention.

Subsequently, as shown in FIG. 20A, for etching technique, for example, reactive ion etching is used to process the silicon layer 333 to form the oscillator 301, the elastic support 302, and the frame part 321 for anodic bonding.

Figure 21A:
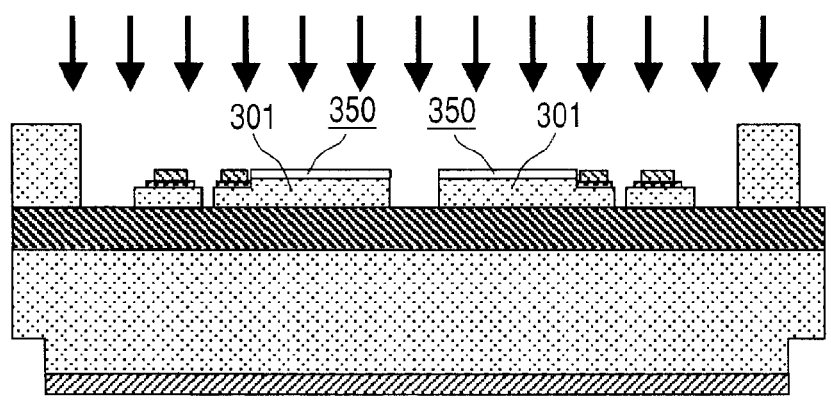
FIGS. 21A and 21B show schematic cross sections of fabrication process steps of an embodiment (the second embodiment) of the fabrication method of an inertial sensor according to the invention.

Subsequently, as shown in FIG. 21A, for example, reactive ion etching is used to form the grooves 350 on the top surface of the oscillator 301 in parallel in the drive direction. For the process steps of forming the grooves 350, the grooves may be processed by any process steps as long as the process steps are those forming the grooves 350 on the oscillator 301 in the direction in parallel with the drive direction. Since the grooves 350 are in parallel in the drive direction, the areas facing to each other are reduced to increase the Q value in the drive direction.

Figure 21B:
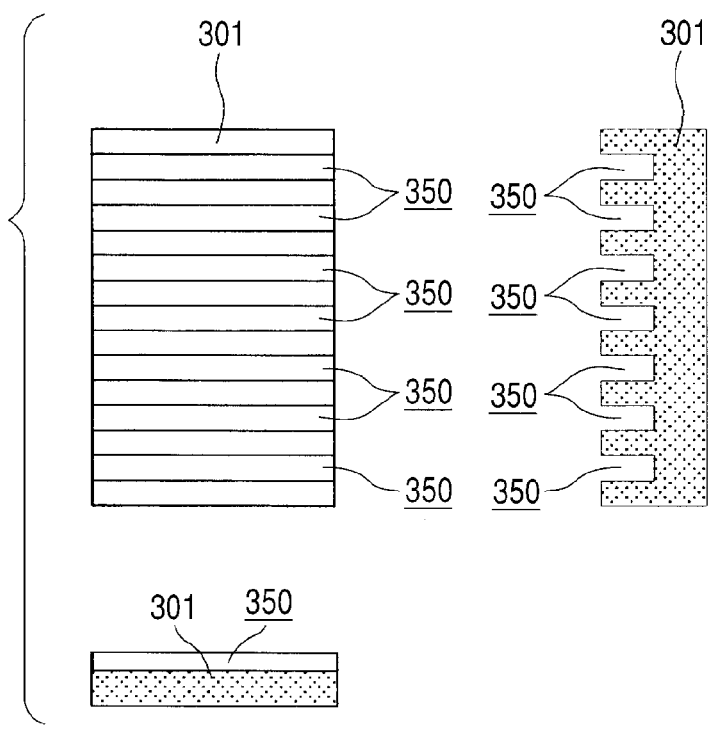

As an example, for the grooves 350, as shown in FIG. 21B depicting three sides of the oscillator, a plurality of the grooves 350 are formed in the direction in parallel with the drive direction of the oscillator 301.

Figure 20B:
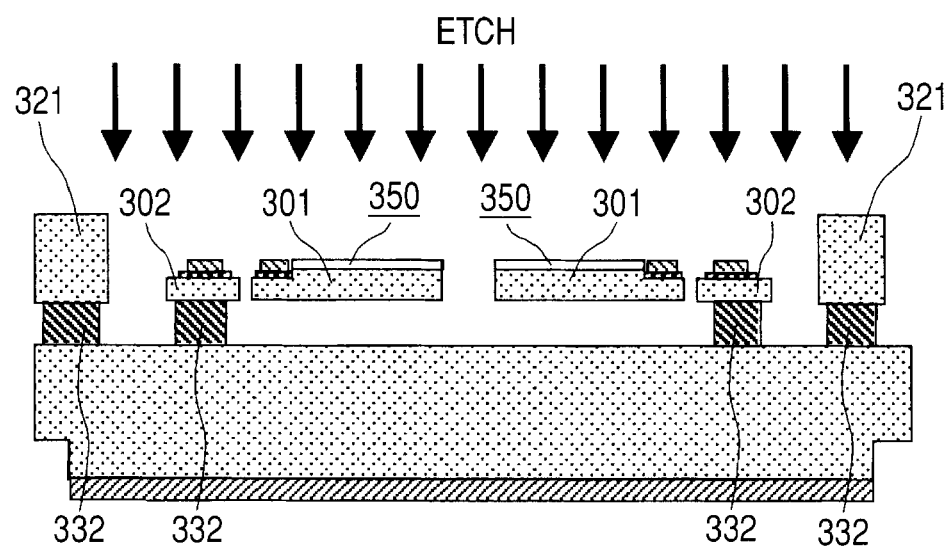

Finally, as shown in FIG. 20B, unnecessary portions, for example, the insulating layer 332 under the oscillator 301 and the elastic support (not shown) is removed by etching. At this time, the insulating layer 332 to be the support part 303 under the silicon layer 333 and the insulating layer 332 to be the frame 321 under the silicon layer 333 are partially left to connect to the silicon layer 331. The other portions have a hollow structure. Thus, the oscillator 301 formed with the grooves 350, the elastic support (not shown), the support part 303 and so on are formed.

Next, a fabrication method of the second substrate side will be described below.

Figure 22A:
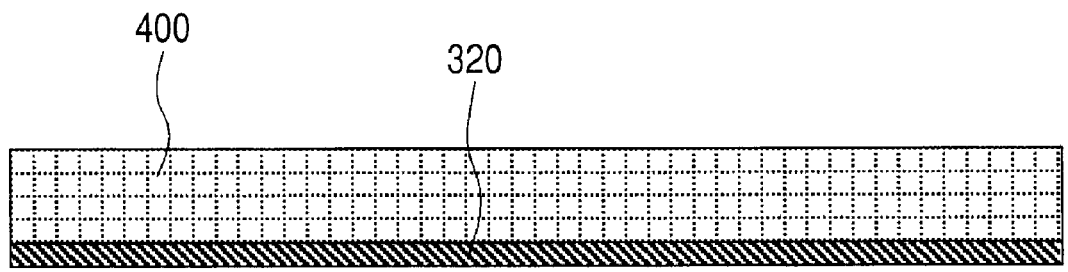
FIGS. 22A to 22C show schematic cross sections of fabrication process steps of an embodiment (the second embodiment) of the fabrication method of an inertial sensor according to the invention.

As shown in FIG. 22A, for a second substrate 400, for example, a glass substrate is used. The second substrate 400 is formed with an electrode 320 by electron beam vapor deposition. For the wiring electrode 320, a three layer metal material of gold, platinum and chromium is used, but a three layer metal material of gold, platinum and titanium, a two layer metal material of gold and chromium, or platinum and chromium, or gold and titanium, or platinum and titanium may be used, or a multilayer material of titanium nitride and titanium may be used instead of titanium. In addition, copper may be used instead of chromium or titanium. Moreover, for the forming method, spattering or CVD may be used.

Figure 22B:
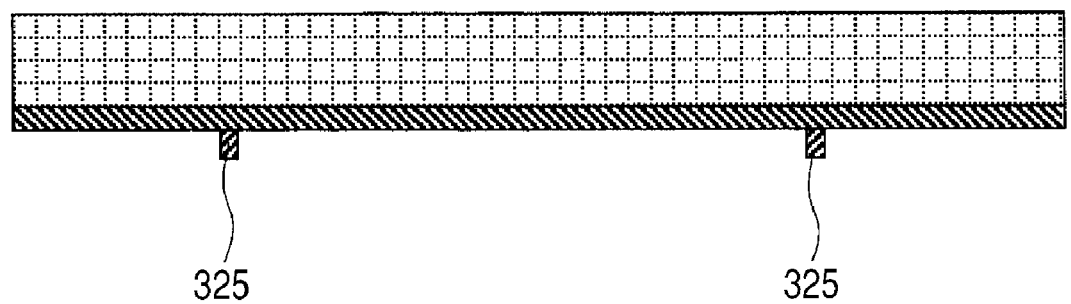

Subsequently, as shown in FIG. 22B, contact parts 325 are formed of a gold support by electroless plating, for example. The gold support is formed in order to contact with a pad on the first substrate 300 side after anodic bonding. In the embodiment, a plurality of the gold supports are formed for each of wiring pads to be arranged right thereunder and to be directly connected to silicon. Thus, the supports bend like a spring in anodic bonding to connect on the first substrate 300 side with moderate tension. Although there are methods of connection using a spring contact and a gold bump, in this method, an excess stress is not applied to the glass substrate, and a forming method is extremely simple. In the embodiment, electroless plating is used, but they can be formed by electrolytic plating.

Figure 22C:
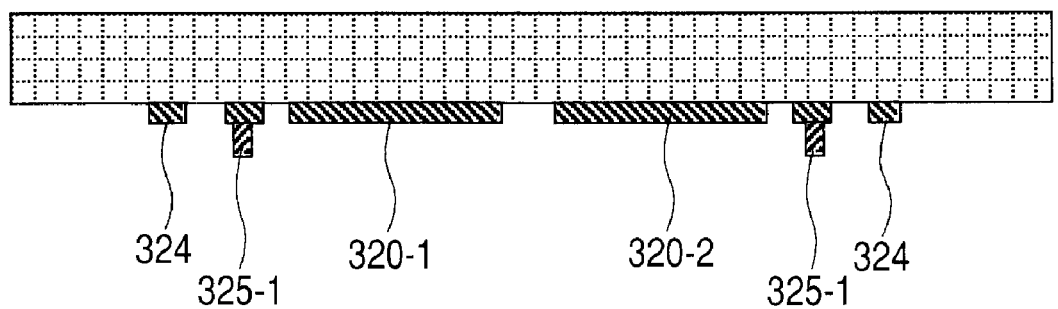

Subsequently, as shown in FIG. 22C, the detection electrode 320-1, the detection electrode 320-2, the lead electrode 324 and so on are formed by etching.

In the process steps above, the lead contact parts 325-1 and 325-2 on the glass substrate side of the electrode (the drive electrode) 308-1 and the electrode (the detection electrode) 308-2 (see FIGS. 20A and 20B) and contacts (not shown) directly connected to the silicon layer 333 (see FIGS. 20A and 20B) are formed, and a lead electrode (not shown) which is connected to the frame 321 (see FIGS. 20A and 20B) is formed.

Next, an assembly method of the first substrate 300 and the second substrate 400 will be described.

Figure 23A:
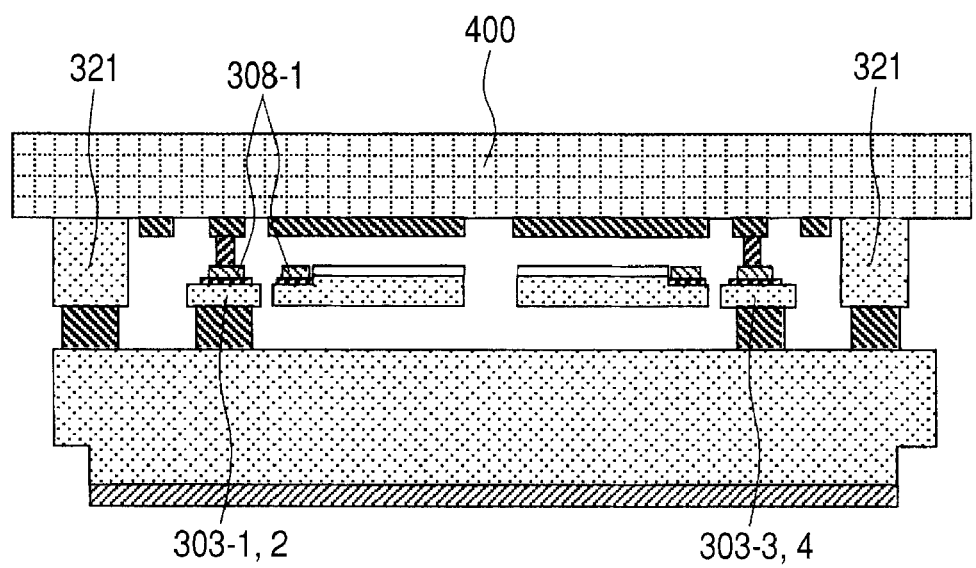
FIGS. 23A and 23B show schematic cross sections of fabrication process steps of an embodiment (the second embodiment) of the fabrication method of an inertial sensor according to the invention.

As shown in FIG. 23A, the second substrate 400 is joined to the frame 321 by anodic bonding. At this time, the contact part 125-1 and the contact part 125-2 are connected to the pad (the portion formed on the support part 303-1) of the electrode 308-1 to generate the Lorentz force and the pad (formed on the support part 303-3) of the electrode 308-2 which detects induced electromotive force generated when the oscillator 301 is operated by electromagnetic drive. Similarly, the contact part (not shown) is connected to the electrode pad (not shown) which is directly connected to the silicon layer 333 (see FIGS. 20A and 20B).

Figure 23B:
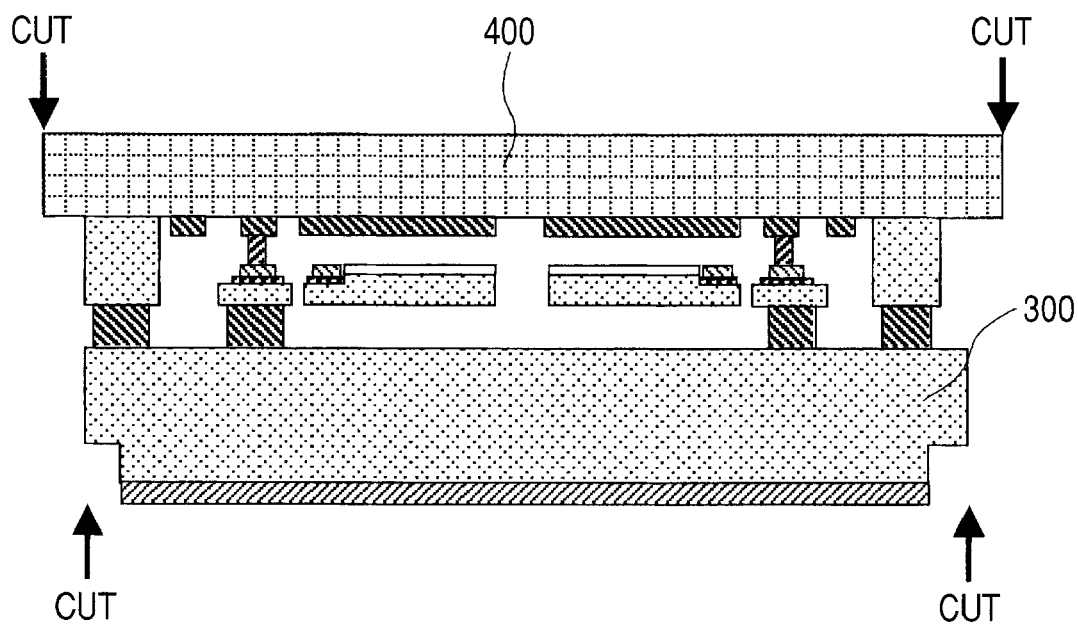

Subsequently, as shown in FIG. 23B, the first substrate 300 and the second substrate 400 are cut by dicing, for example, to form individual chips.

Figure 24:
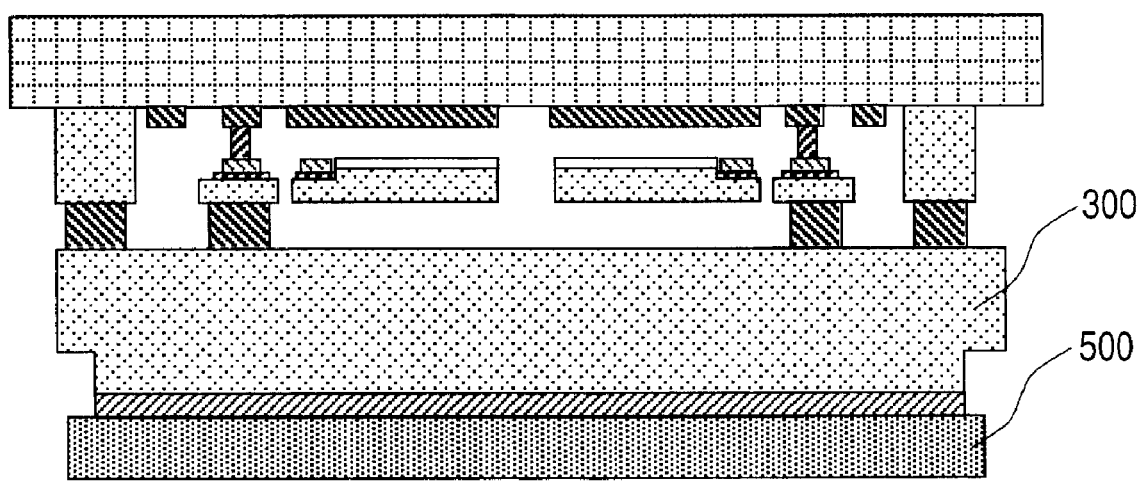
FIG. 24 shows a schematic cross section of fabrication process steps of an embodiment (the second embodiment) of the fabrication method of an inertial sensor according to the invention.

Finally, as shown in FIG. 24, the magnet 500 is formed on the lower part of the first substrate 300, and thus the inertial sensor 2 for angular velocity detection is fabricated. After that, not shown in the drawing, the inertial sensor 2 is mounted on a package.

According to the fabrication method of the inertial sensor 2, the Q value can be increased even though the degree of vacuum is close to the atmospheric pressure. Therefore, since the influence of a gas leakage into the package from outside or gas generated inside the package can be prevented, such advantages can be obtained that the airtight structure of the package can be simplified, and that the cost of the package can be decreased. In addition, as compared with the case in which the degree of vacuum is raised to increase the Q value, an increase in the Q value on the detection side can be suppressed. Therefore, such advantages can be provided that the time period for stable state of the damping oscillation is shortened at the time when the angular velocity is applied, and that the signal-to-noise ratio and the response of the inertial sensor are improved.

It should be understood by those skilled in the art that various modifications, combinations, sub-combinations and alterations may occur depending on design requirements and other factors insofar as they are within the scope of the appended claims or the equivalents thereof.

What is claimed is:

1. An inertial sensor comprising:
    an elastic support whose one end is supported by a support part disposed on a substrate;
    an oscillator which is supported by another end of the elastic support where separated from the substrate;
    a displacement detecting part which detects a displacement of the oscillator to output a signal,
    a driving part which drives the oscillator and is positioned adjacently to the displacement detecting part, and
    a monitoring part which monitors the oscillator and is positioned in the substrate,
    wherein,
    the oscillator is formed with one or both of a groove and a through hole in a direction in parallel with a drive direction of the oscillator, and
    the monitoring part is positioned opposite the displacement detecting part relative to the oscillator.

2. The inertial sensor according to claim 1, wherein
    a Q value for a drive mode satisfies a relation Q value>100, and
    a Q value Qs for the detection mode and a frequency $\omega s$ for the detection mode satisfy a relation $\exp(-\omega s/200 Qs)<0.1$.

3. The inertial sensor according to claim 1, wherein a drive atmosphere of the oscillator is encapsulated in an atmosphere in which pressure is more reduced than an atmosphere in which the inertial sensor is used.

4. A fabrication method of an inertial sensor having an elastic support whose one end is supported by a support part disposed on a substrate, an oscillator which is supported by an other end of the elastic support where separated from the substrate, and a displacement detecting part which detects a displacement of the oscillator to output a signal, a driving part which drives the oscillator and is positioned adjacently to the displacement detecting part, and a monitoring part which monitors the oscillator and is positioned in the substrate, the monitoring part is positioned opposite the displacement detecting part relative to the oscillator, the method comprising the step of:
    forming one or both of a groove and a through hole in a direction in parallel with a drive direction of the oscillator in a step of forming the oscillator.

* * * * *